United States Patent
Zhang et al.

(10) Patent No.: US 8,279,644 B2
(45) Date of Patent: Oct. 2, 2012

(54) METHOD AND SYSTEM FOR PROVIDING MAXIMUM POWER POINT TRACKING IN AN ENERGY GENERATING SYSTEM

(75) Inventors: Jianhui Zhang, San Jose, CA (US); Ali Djabbari, Saratoga, CA (US); Gianpaolo Lisi, Campbell, CA (US)

(73) Assignee: National Semiconductor Corporation, Santa Clara, CA (US)

(*) Notice: Subject to any disclaimer, the term of this patent is extended or adjusted under 35 U.S.C. 154(b) by 595 days.

(21) Appl. No.: 12/456,776

(22) Filed: Jun. 23, 2009

(65) Prior Publication Data

US 2009/0284998 A1 Nov. 19, 2009

Related U.S. Application Data

(63) Continuation-in-part of application No. 12/152,491, filed on May 14, 2008, now Pat. No. 7,969,133.

(60) Provisional application No. 61/170,567, filed on Apr. 17, 2009.

(51) Int. Cl.
*H02H 7/122* (2006.01)

(52) U.S. Cl. .............. 363/55; 363/95; 363/98; 363/131; 232/285

(58) Field of Classification Search .................. 323/222, 323/223, 224, 265, 266, 282, 283, 284, 285; 363/37, 55, 56.03, 65, 95, 97, 98, 131
See application file for complete search history.

(56) References Cited

U.S. PATENT DOCUMENTS

| | | | |
|---|---|---|---|
| 3,740,636 A | 6/1973 | Hogrefe et al. | |
| 4,129,788 A | 12/1978 | Chavannes | |
| 4,189,765 A | 2/1980 | Kotalik et al. | |
| 4,280,097 A | 7/1981 | Carey et al. | |
| 4,688,538 A | 8/1987 | Ward et al. | |
| 4,725,740 A | 2/1988 | Nakata | |
| 5,284,719 A | 2/1994 | Landau et al. | |
| 5,307,006 A | 4/1994 | Rankin et al. | |
| 5,408,404 A | 4/1995 | Mitchell | |
| 5,412,308 A | 5/1995 | Brown | |
| 5,528,125 A | 6/1996 | Marshall et al. | |

(Continued)

FOREIGN PATENT DOCUMENTS

EP  1 239 573 A1  9/2002

(Continued)

OTHER PUBLICATIONS

"PV FAQs", U.S. Department on Energy, Jan. 2004, 2 pages.

(Continued)

*Primary Examiner* — Nguyen Tran
(74) *Attorney, Agent, or Firm* — William B. Kempler; Wade J. Brady, III; Frederick J. Telecky, Jr.

(57) ABSTRACT

A method for providing a maximum power point tracking (MPPT) process for an energy generating device is provided. The method includes coupling a local converter to the energy generating device. A determination is made regarding whether the local converter is operating at or below a maximum acceptable temperature. A determination is made regarding whether at least one current associated with the local converter is acceptable. When the local converter is determined to be operating at or below the maximum acceptable temperature and when the at least one current associated with the local converter is determined to be acceptable, the MPPT process is enabled within the local converter.

20 Claims, 13 Drawing Sheets

U.S. PATENT DOCUMENTS

| | | | |
|---|---|---|---|
| 5,600,247 A | 2/1997 | Matthews | |
| 5,604,430 A * | 2/1997 | Decker et al. | 323/275 |
| 5,659,465 A | 8/1997 | Flack et al. | |
| 5,666,040 A | 9/1997 | Bourbeau | |
| 5,669,987 A | 9/1997 | Takehara et al. | |
| 5,747,967 A | 5/1998 | Muljadi et al. | |
| 5,751,120 A | 5/1998 | Zeitler et al. | |
| 5,892,354 A | 4/1999 | Nagao et al. | |
| 6,169,678 B1 | 1/2001 | Kondo et al. | |
| 6,184,656 B1 | 2/2001 | Karunasiri et al. | |
| 6,281,485 B1 | 8/2001 | Siri | |
| 6,331,670 B2 | 12/2001 | Takehara et al. | |
| 6,369,576 B1 | 4/2002 | Matthews et al. | |
| 6,608,404 B2 | 8/2003 | Schienbein et al. | |
| 6,633,823 B2 | 10/2003 | Bartone et al. | |
| 6,636,431 B2 | 10/2003 | Seki et al. | |
| 6,717,519 B2 | 4/2004 | Kobayashi et al. | |
| 6,750,391 B2 | 6/2004 | Bower et al. | |
| 6,844,739 B2 | 1/2005 | Kasai et al. | |
| 6,850,820 B2 | 2/2005 | Tajima | |
| 6,966,184 B2 | 11/2005 | Toyomura et al. | |
| 6,975,522 B2 | 12/2005 | Asano | |
| 6,984,967 B2 | 1/2006 | Notman | |
| 7,046,527 B2 | 5/2006 | West | |
| 7,477,080 B1 | 1/2009 | Fest | |
| 7,566,828 B2 | 7/2009 | Sasaki | |
| 7,605,498 B2 | 10/2009 | Ledenev et al. | |
| 7,701,083 B2 | 4/2010 | Savage | |
| 7,723,865 B2 | 5/2010 | Kitanaka | |
| 7,759,903 B2 | 7/2010 | Kamata | |
| 7,843,085 B2 | 11/2010 | Ledenev et al. | |
| 7,925,552 B2 | 4/2011 | Tarbell et al. | |
| 2002/0038667 A1 | 4/2002 | Kondo et al. | |
| 2003/0201674 A1 | 10/2003 | Droppo et al. | |
| 2004/0135545 A1 | 7/2004 | Fowler et al. | |
| 2005/0105224 A1 | 5/2005 | Nishi | |
| 2005/0257827 A1 | 11/2005 | Gaudiana et al. | |
| 2006/0017327 A1 | 1/2006 | Siri et al. | |
| 2006/0149607 A1 | 7/2006 | Sayers et al. | |
| 2006/0162772 A1 | 7/2006 | Presher, Jr. et al. | |
| 2006/0171182 A1 | 8/2006 | Siri et al. | |
| 2006/0176036 A1 | 8/2006 | Flatness et al. | |
| 2007/0024257 A1 | 2/2007 | Boldo | |
| 2007/0137688 A1 | 6/2007 | Yoshida | |
| 2007/0164612 A1 | 7/2007 | Wendt et al. | |
| 2008/0013347 A1 | 1/2008 | Deng et al. | |
| 2008/0087321 A1 | 4/2008 | Schwartzman | |
| 2008/0097655 A1 | 4/2008 | Hadar et al. | |
| 2008/0143188 A1 | 6/2008 | Adest et al. | |
| 2008/0147335 A1 | 6/2008 | Adest et al. | |
| 2008/0150366 A1 | 6/2008 | Adest et al. | |
| 2008/0278983 A1 * | 11/2008 | Park | 363/95 |
| 2009/0039852 A1 | 2/2009 | Fishelov et al. | |
| 2009/0140719 A1 | 6/2009 | Hasenfus | |
| 2009/0242011 A1 | 10/2009 | Proisy et al. | |
| 2009/0283128 A1 | 11/2009 | Zhang et al. | |
| 2009/0283129 A1 | 11/2009 | Foss | |
| 2009/0284078 A1 | 11/2009 | Zhang et al. | |
| 2009/0284232 A1 | 11/2009 | Zhang et al. | |
| 2009/0284240 A1 | 11/2009 | Zhang et al. | |
| 2009/0289502 A1 * | 11/2009 | Batarseh et al. | 307/44 |
| 2010/0001587 A1 | 1/2010 | Casey et al. | |
| 2010/0126550 A1 | 5/2010 | Foss | |
| 2010/0269883 A1 | 10/2010 | Sarhan | |
| 2010/0288327 A1 | 11/2010 | Lisi et al. | |
| 2010/0327659 A1 | 12/2010 | Lisi et al. | |

FOREIGN PATENT DOCUMENTS

| | | |
|---|---|---|
| ES | 2 249 147 B1 | 5/2007 |
| JP | 07-234733 A | 9/1995 |
| JP | 08-123563 A | 5/1996 |
| JP | 08-314555 A | 11/1996 |
| JP | 10014105 A | 1/1998 |
| JP | 10155240 A | 6/1998 |
| JP | 11098679 A | 4/1999 |
| JP | 2000112545 A | 4/2000 |
| JP | 2000116010 A | 4/2000 |
| JP | 2003134661 A | 5/2003 |
| JP | 2003216255 A | 7/2003 |
| JP | 2005-151662 | 6/2005 |
| JP | 2005243852 A | 9/2005 |
| JP | 2005252172 A | 9/2005 |
| JP | 2006134118 A | 5/2006 |
| JP | 2006216660 A | 8/2006 |
| JP | 2006-320149 | 11/2006 |
| JP | 2007-133765 | 5/2007 |
| KR | 100757320 B1 | 9/2007 |
| KR | 20080010116 A | 1/2008 |
| KR | 100886891 B1 | 3/2009 |
| KR | 1020090133036 A | 12/2009 |
| WO | WO 2007/084196 A2 | 7/2007 |

OTHER PUBLICATIONS

"Perspectives of Concentrating Solar Power", Renewable Energy India 2008 Expo, Aug. 22, 2008, 16 pages.

"APEC 2008, 23rd Annual Applied Power Electronics Conference and Exposition", vol. 1, Seminars 1-6, Feb. 24-28, 2008, Austin, Texas, 89 pages.

Yunwei Li, et al., "Design, Analysis, and Real-Time Testing of a Controller for Multibus Microgrid System", IEEE Transactions on Power Electronics, vol. 19, No. 5, Sep. 2004, p. 1195-1204.

R.H. Lasseter, "MicroGrids", 2002 IEEE Power Engineering Society Winter Meeting, vol. 1, Jan. 2002, p. 305-308.

John Stevens, "Development of Sources and a Testbed for CERTS Microgrid Testing", 2004 IEEE Power Engineering Society General Meeting, Jun. 2004, p. 1-2.

Mike Barnes, et al., "Real-World MicroGrids—An Overview", 2007 IEEE SoSE International Conference, Apr. 2007, p. 1-8.

Paolo Piagi, et al., "Autonomous Control of Microgrids", IEEE Power Engineering Society General Meeting, Jun. 2006, 8 pages.

Y. Zoka, et al., "An Interaction Problem of Distributed Generators Installed in a MicroGrid", 2004 IEEE International Conference on Electric Utility Deregulation, Restructuring and Power Technologies (DRPT2004), Apr. 2004, Hong Kong, p. 795-799.

M.P.F. Hommelberg, et al., "Distributed Control Concepts using Multi-Agent technology and Automatic Markets: An indispensable feature of smart power grids", 2007 IEEE Power Engineering Society General Meeting, Jun. 2007, p. 1-7.

Notification of Transmittal of the International Search Report and the Written Opinion of the International Searching Authority, or the Declaration dated Dec. t7, 2009 in connection with PCT Application No. PCT/US2009/044033.

Guo Heng, et al., "A Novel Maximum Power Point Tracking Strategy for Stand-along Solar Pumping Systems", 2005 IEEE, 5 pages.

Debosmita Das, et al., "An Optimal Design of a Grid Connected Hybrid Wind/Photovoltaic/Fuel Cell System for Distributed Energy Production", 2005 IEEE, p. 2499-2504.

Claus Bjerge, et al., "How to run an offshore wind farm like a conventional power plant", www.modernpowersystems.com, Jan. 2007, 4 pages.

Steven Anderson, "Remote . . . But Not Economically Out of Reach", Power and Energy, Dec. 15, 1986, 5 pages.

Qihi Liu, et al., "Novel Modeling and Control of Doubly-Fed Variable-Speed Constant-Frequency Wind Power Generator", The 33rd Annual Conference of the IEEE Industrial Electronics Society (IECON), Nov. 5-8, 2007, p. t621-t626.

Casisheng Wang, "Modeling and Control of Hybrid Wind/ Photovoltaic/Fuel Cell Distributed Generation Systems", Jul. 2006, Montana State University, 403 pages.

Notification of Transmittal of the International Search Report and the Written Opinion of the International Searching Authority, or the Declaration dated Dec. 23, 2009 in connection with International Patent Application No. PCT/US2009/044036.

Jianhui Zhang, et al., "Active Cell and Module Balancing for Batteries or Other Power Supplies", U.S. Appl. No. 12/882,781, filed Sep. 15, 2010.

Ramesh Khanna, "Solar-Powered Battery Charger and Related System and Method", U.S. Appl. No. 12/589,984, filed Oct. 30, 2009.

Andrew Foss, "System and Method for Solar Panel Array Analysis", U.S. Appl. No. 12/386,958, filed Apr. 24, 2009.

Gianpaolo Lisi, et al., "Off-Grid LED Street Lighting System With Multiple Panel-Storage Matching", U.S. Appl. No. 12/925,110, filed Oct. 14, 2010.

Notification of Transmittal of the International Search Report and the Written Opinion of the International Searching Authority, or the Declaration dated Jan. t3, 2011 in connection with PCT Application No. PCT/US2010/034783.

Notification of Transmittal of the International Search Report and the Written Opinion of the International Searching Authority, or the Declaration dated Jan. 3, 2011 in connection with PCT Application No. PCT/US2010/031505.

Notification of Transmittal of the International Search Report and the Written Opinion of the International Searching Authority, or the Declaration dated Dec. 31, 2010 in connection with PCT Application No. PCT/US2010/031462.

Notification of Transmittal of the International Search Report and the Written Opinion of the International Searching Authority, or the Declaration dated Dec. 23, 2009 in connection with PCT Application No. PCT/US2009/044027.

Werner Rößler, "Boost battery performance with active charge-balancing", EE Times-Asia, Jul. 16-31, 2008, p. 1-3.

Jianhui Zhang, et al., "Method and System for Providing Central Control in a Energy Generating System", U.S. Appl. No. 12/152,479, filed May 14, 2008.

Stephen W. Moore, el al., "A Review of Cell Equalization Methods for Lithium Ion and Lithium Polymer Battery Systems", Society of Automotive Engineers, Inc., 2001, 5 pages.

Sihua Wen, "Cell balancing buys extra run time and battery life", Analog Applications Journal, 2009, 8 pages.

"Five to Ten Series Cell Lithium-Ion or Lithium-Polymer battery Protector and Analog Front End", Texas Instruments, Jun. 2008, 60 pages.

"Li-Ion, NiMH Battery Measuring, Charge Balancing and Power-supply Circuit", Atmel Corporation, Oct. 2009, 55 pages.

Office Action dated Sep. 21, 2011 in connection with U.S. Appl. No. 12/456,777.

Office Action dated Aug. 30, 2011 in connection with U.S. Appl. No. 12/386,958.

Notification of Transmittal of the International Search Report and the Written Opinion of the International Searching Authority, or the Declaration dated Dec. 24, 2009 in connection with International Patent Application No. PCT/US2009/044019.

Carlos Meza, et al., "Boost-Buck inverter variable structure control for grid-connected photovoltaic systems", 2005 IEEE, p. 1318-1321.

Mikihiko Matsui, et al., "A New Maximum Photovoltaic Power Tracking Control Scheme Based on Power Equilibrium at DC Link", 1999 IEEE, p. 804-809.

"Micropower Synchronous, Buck-Boost DC/DC Converter", MiniLogic Device Corporation, Sep. 2005, p. 1-13.

Geoffrey R. Walker, et al., "Cascaded DC-DC Converter Connection of Photovoltaic Modules", IEEE Transactions on Power Electronics, vol. 19, No. 4, Jul. 2004, p. 1130-1139.

Notification of Transmittal of the international Search Report and the Written Opinion of the International Searching Authority, or the Declaration dated Dec. 23, 2009 in connection with PCT Application No. PCT/US2009/044015.

Office Action dated Jan. 25, 2012 in connection with U.S. Appl. No. 12/454,136.

Office Action dated Dec. 9, 2011 in connection with U.S. Appl. No. 12/454,244.

Office Action dated Nov. 25, 2011, in connection with U.S. Appl. No. 12/272,990.

* cited by examiner

US 8,279,644 B2

METHOD AND SYSTEM FOR PROVIDING MAXIMUM POWER POINT TRACKING IN AN ENERGY GENERATING SYSTEM

CROSS-REFERENCE TO RELATED APPLICATIONS

The present application claims priority under 35 U.S.C. §119(e) to U.S. Provisional Patent Application Ser. No. 61/170,567 filed on Apr. 17, 2009.

The present application also claims priority as a continuation-in-part to U.S. patent application Ser. No. 12/152,491, titled "METHOD AND SYSTEM FOR PROVIDING LOCAL CONVERTERS TO PROVIDE MAXIMUM POWER POINT TRACKING IN AN ENERGY GENERATING SYSTEM," filed May 14, 2008 now U.S. Pat. No. 7,969,133. This patent application is assigned to the assignee of the present application. The subject matter disclosed in this patent application is hereby incorporated by reference into the present disclosure as if fully set forth herein.

The present application is related to U.S. patent application Ser. No. 12/456,777, titled "METHOD AND SYSTEM FOR INTEGRATING LOCAL MAXIMUM POWER POINT TRACKING INTO AN ENERGY GENERATING SYSTEM HAVING CENTRALIZED MAXIMUM POWER POINT TRACKING," filed concurrently herewith. This patent application is assigned to the assignee of the present application. The subject matter disclosed in this patent application is hereby incorporated by reference into the present disclosure as if fully set forth herein.

TECHNICAL FIELD

This disclosure is generally directed to energy generating systems. More specifically, this disclosure is directed to a method and system for providing maximum power point tracking in an energy generating system.

BACKGROUND

Solar and wind energy provide renewable, non-polluting energy sources, as opposed to conventional non-renewable, polluting energy sources, such as coal or oil. Because of this, solar and wind energy have become increasingly important as energy sources that may be converted into electricity. For solar energy, photovoltaic panels arranged in an array typically provide the means to convert solar energy into electrical energy. Similar arrays may be implemented for harvesting energy from wind or other natural energy sources.

In operating a photovoltaic array, maximum power point tracking (MPPT) is generally used to automatically determine a voltage or current at which the array should operate to generate a maximum power output for a particular temperature and solar irradiance. Although MPPT for the entire array is relatively easy to perform when the array is operating under ideal conditions (i.e., the same irradiance, temperature and electrical features for each panel in the array), when there are mismatches or partially shaded conditions, MPPT for the array as a whole is more complicated. In this situation, MPPT techniques may not provide accurate results due to relative optima of the multi-peak power-to-voltage characteristics of the mismatched array. As a result, only a few of the panels in the array may be operating ideally. This causes a drastic drop in power production because, for an array that includes strings of panels, the least efficient panel in a string determines the current and efficiency for the entire string.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 12, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1A:
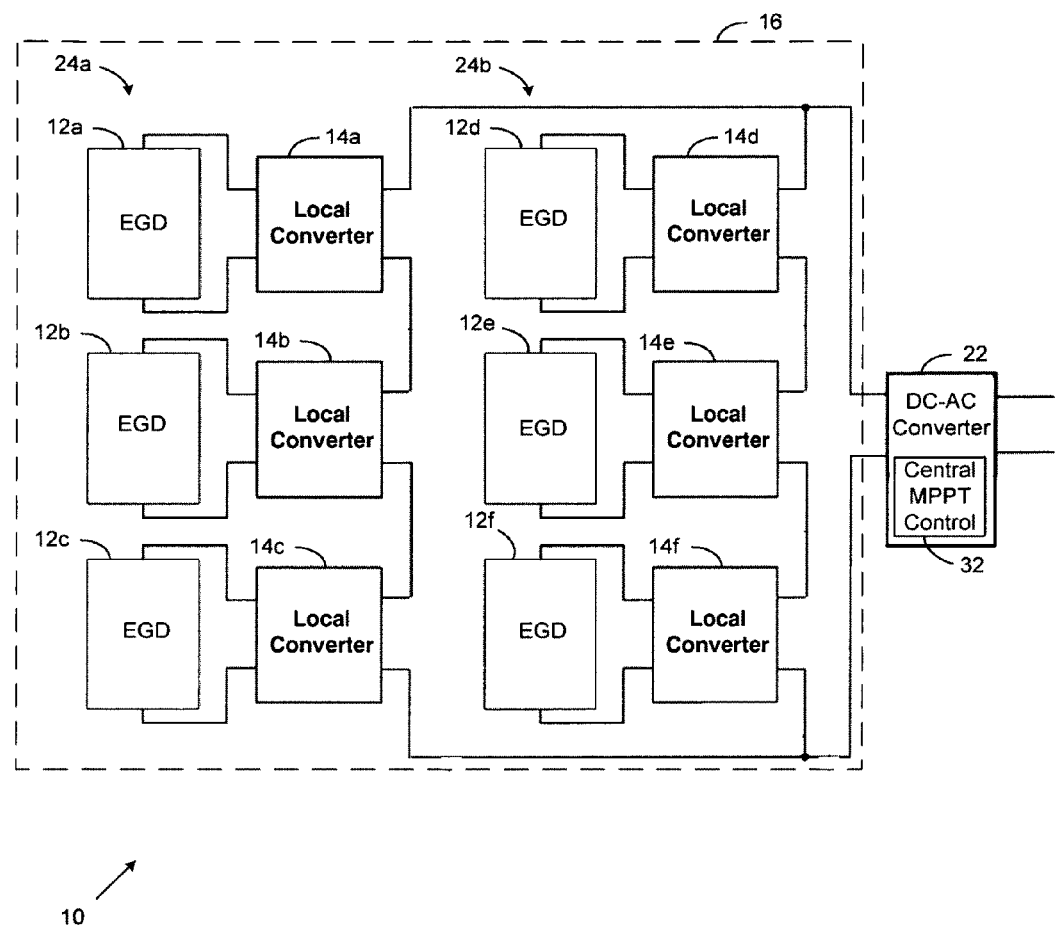
FIG. 1A illustrates an energy generating system capable of integrating local maximum power point tracking (MPPT) with centralized MPPT in accordance with one embodiment of this disclosure.

FIG. 1A illustrates an energy generating system 10 capable of integrating local maximum power point tracking (MPPT) with centralized MPPT in accordance with one embodiment of this disclosure. The energy generating system 10 comprises a plurality of energy generating devices (EGDs) 12, each coupled to a corresponding local converter 14, that together form an energy generating array 16. The illustrated photovoltaic system 10 also comprises a DC-AC converter 22 coupled to the local converters 14 and capable of receiving current and voltage from the local converters 14.

For a particular embodiment, as described in this disclosure, the energy generating system 10 may comprise a photovoltaic system and the energy generating devices 12 may comprise photovoltaic (PV) panels. However, it will be understood that the energy generating system 10 may comprise any other suitable type of energy generating system, such as a wind turbine system, a fuel cell system or the like. For these embodiments, the energy generating devices 12 may comprise wind turbines, fuel cells or the like. Also, the energy generating system 10 may be either a grounded system or a floating system.

The PV panels 12 in the array 16 are arranged in strings 24. For the illustrated embodiment, the array 16 comprises two strings 24, with each string 24 comprising three panels 12. However, it will be understood that the array 16 may comprise any suitable number of strings 24, and each string 24 may comprise any suitable number of panels 12. Also for the illustrated embodiment, the panels 12 in each string 24 are implemented in a series connection. As a result, the output voltage of each local converter 14 may still be close to its input voltage while supplying high voltage to the input port of the DC-AC converter 22, which for some embodiments may operate with an input voltage between 150 V and 500 V. Therefore, there is no need for a transformer-based converter such as would be used in a parallel-configuration string, resulting in the ability to implement highly efficient and low cost local converters 14.

Each PV panel 12 is capable of converting solar energy into electrical energy. Each local converter 14 is coupled to its corresponding panel 12 and is capable of reshaping the voltage-to-current relationship of inputs provided by the panel 12 such that the electrical energy generated by the panel 12 is usable by a load (not shown in FIG. 1A) for the array 16. The DC-AC converter 22 is coupled to the array 16 and is capable of converting the direct current (DC) generated by the local converters 14 into an alternating current (AC) for the load, which may be coupled to the DC-AC converter 22. The DC-AC converter 22 comprises a central MPPT control block 32 that is capable of providing centralized MPPT by calibrating the MPP of the array 16.

MPPT automatically determines a voltage or current at which the array 16 or the panel 12 should operate to generate a maximum power output for a particular temperature and solar irradiance. Centralized MPPT for the entire array 16 is relatively easy to perform when the array 16 is operating under ideal conditions (i.e., the same irradiance, temperature and electrical features for each panel 12 in the array 16). However, when there are mismatches or partially shaded conditions, for example, centralized MPPT for the array 16 as a whole is more complicated. In this situation, MPPT techniques may not provide accurate results due to relative optima of the multi-peak power-to-voltage characteristics of the mismatched array 16. As a result, only a few of the panels 12 in the array 16 may be operating ideally, causing a drastic drop in power production. Therefore, to resolve this issue, each local converter 14 is capable of providing local MPPT for its corresponding panel 12. In this way, each panel 12 may operate at its own maximum power point (MPP) under both ideal and mismatched or shaded conditions. For embodiments in which the energy generating devices 12 comprise wind turbines, MPPT may be used to adjust the pitch of the blades of the wind turbines. It will also be understood that MPPT may be used to optimize systems 10 comprising other types of energy generating devices 12.

The energy generating system 10 provides a system control loop for the entire system 10 that is controlled by the central MPPT control block 32 and a local control loop for each of the panels 12 that is controlled by the corresponding local converter 14. The operating frequencies of these loops are spaced apart at least a predefined distance from each other in order to prevent system oscillations and to prevent the panels 12 from operating away from their MPPs. For one embodiment, the system control loop is a closed-loop system that comprises the array 16, the central MPPT control block 32, and the DC-AC converter 22. In addition, each local control loop is a closed-loop system that comprises a panel 12 and its corresponding local converter 14.

For some embodiments, each local converter 14 is designed such that the settling time of the local control loop for that converter 14 is faster than a time constant for the system control loop. In a particular embodiment, the settling time of each local control loop is at least five times faster than the time constant of the system control loop. As a result, at steady state, the array 16 of panels 12 may be seen by the DC-AC converter 22 as a power source with the amount of power being the sum of the maximum powers available at each panel 12. At the same time, the central MPPT control block 32 may perform its normal optimization algorithm, and eventually the central MPPT control block 32 may set the string voltages to values that maximize the efficiencies of the local converters 14.

In this way, system oscillations that could result from dynamic interaction between the system control loop and the local control loops are avoided. In addition, the panels 12 may generally be operated at their MPPs. Also, synchronization may be provided between the system and local loops to avoid damage that could occur as a result of indefinitely growing string voltages. Finally, islanding of the DC-AC converter 22 that would stop the DC-AC converter 22 from sinking power and cause uncontrolled growth of its input voltage is prevented.

Figure 1B:
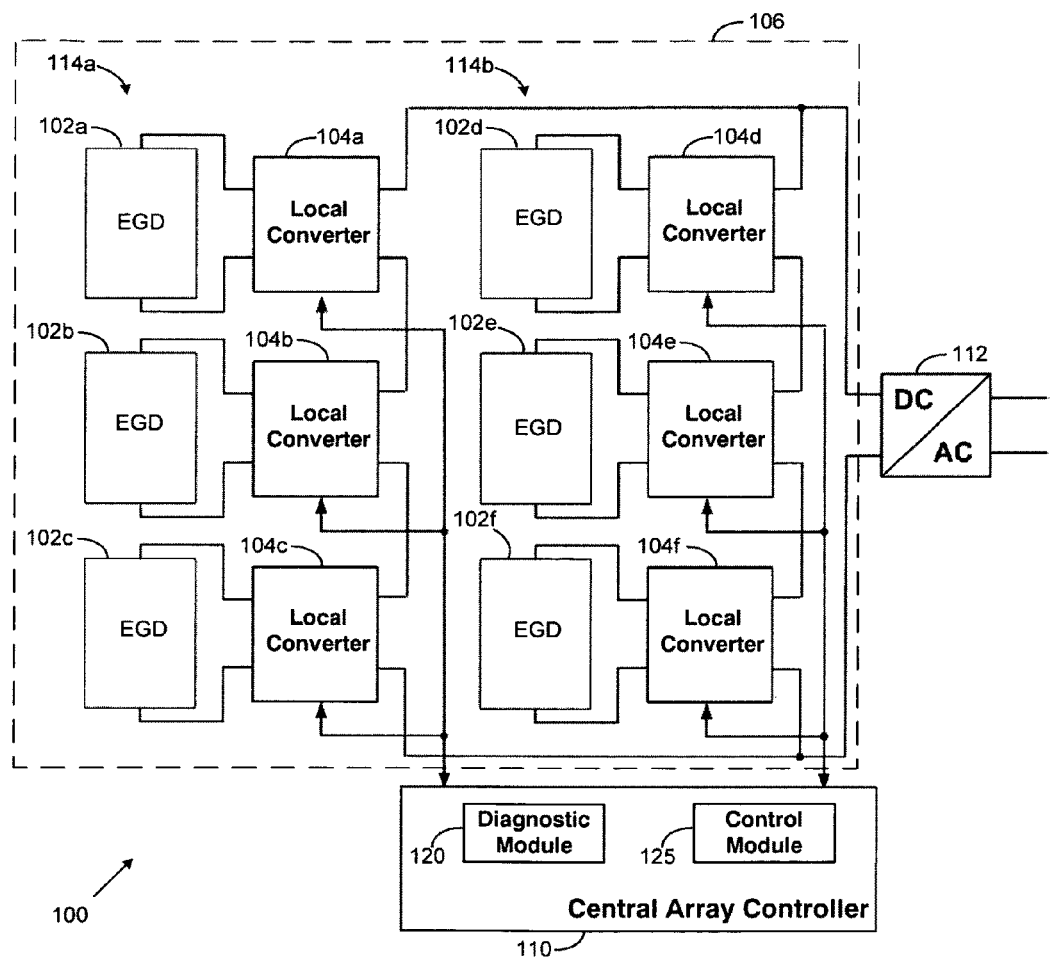
FIG. 1B illustrates an energy generating system capable of being centrally controlled in accordance with one embodiment of this disclosure.

FIG. 1B illustrates an energy generating system 100 capable of being centrally controlled in accordance with one embodiment of this disclosure. The energy generating system 100 comprises a plurality of energy generating devices (EGDs) 102, each coupled to a corresponding local converter 104, that together form an energy generating array 106. For a particular embodiment, as described in this disclosure, the energy generating system 100 may comprise a photovoltaic system and the energy generating devices 102 may comprise photovoltaic (PV) panels. However, it will be understood that the energy generating system 100 may comprise any other suitable type of energy generating system, such as a wind turbine system, a fuel cell system or the like. For these embodiments, the energy generating devices 102 may comprise wind turbines, fuel cells or the like. Also, the energy generating system 100 may be either a grounded system or a floating system.

The illustrated photovoltaic system 100 comprises a central array controller 110 and may also comprise a DC-AC converter 112 or other suitable load for situations in which the system 100 is operated as an on-grid system. However, it will be understood that the system 100 may be operated as an off-grid system by coupling the array 106 to a battery charger or other suitable energy storage device instead of the DC-AC converter 112.

The PV panels 102 in the array 106 are arranged in strings 114. For the illustrated embodiment, the array 106 comprises two strings 114, with each string 114 comprising three panels 102. However, it will be understood that the array 106 may comprise any suitable number of strings 114, and each string 114 may comprise any suitable number of panels 102. Also for the illustrated embodiment, the panels 102 in each string 114 are implemented in a series connection. As a result, the output voltage of each local converter 104 may still be close to its input voltage while supplying high voltage to the input port of the DC-AC converter 112, which for some embodiments may operate with an input voltage between 150 V and 500 V. Therefore, there is no need for a transformer-based converter such as would be used in a parallel-configuration string, resulting in the ability to implement highly efficient and low cost local converters 104.

Each PV panel 102 is capable of converting solar energy into electrical energy. Each local converter 104 is coupled to its corresponding panel 102 and is capable of reshaping the voltage-to-current relationship of inputs provided by the panel 102 such that the electrical energy generated by the panel 102 is usable by a load (not shown in FIG. 1B) for the array 106. The DC-AC converter 112 is coupled to the array 106 and is capable of converting the direct current (DC) generated by the local converters 104 into an alternating current (AC) for the load, which may be coupled to the DC-AC converter 112.

Maximum power point tracking (MPPT) automatically determines a voltage or current at which the panel 102 should operate to generate a maximum power output for a particular temperature and solar irradiance. MPPT for the entire array 106 is relatively easy to perform when the array 106 is operating under ideal conditions (i.e., the same irradiance, temperature and electrical features for each panel 102 in the array 106). However, when there are mismatches or partially shaded conditions, for example, MPPT for the array 106 as a whole is more complicated. In this situation, MPPT techniques may not provide accurate results due to relative optima of the multi-peak power-to-voltage characteristics of the mismatched array 106. As a result, only a few of the panels 102 in the array 106 may be operating ideally, causing a drastic drop in power production. Therefore, to resolve this issue, each local converter 104 is capable of providing local MPPT for its corresponding panel 102. In this way, each panel 102 may operate at its own maximum power point (MPP) under both ideal and mismatched or shaded conditions. For embodiments in which the energy generating devices 102 comprise wind turbines, MPPT may be used to adjust the pitch of the blades of the wind turbines. It will also be understood that MPPT may be used to optimize systems 100 comprising other types of energy generating devices 102.

The central array controller 110 is coupled to the array 106 and may be capable of communicating with the array 106 over either a wired link (such as a serial or parallel bus) or a wireless link. The central array controller 110 may comprise a diagnostic module 120 and/or a control module 125. The diagnostic module 120 is capable of monitoring the photovoltaic system 100, while the control module 125 is capable of controlling the photovoltaic system 100.

The diagnostic module 120 is capable of receiving from each local converter 104 in the array 106 both local converter data for the local converter 104 and device data for the local converter's 104 corresponding panel 102. As used herein, "device data" means output voltage, output current, temperature, irradiation, output power and/or the like for a panel 102. Similarly, "local converter data" means local converter output voltage, local converter output current, local converter output power and/or the like.

The diagnostic module 120 may also be capable of generating reports on the system 100 and providing the reports to an operator. For example, the diagnostic module 120 may be capable of displaying some or all of the device data and local converter data to the operator. In addition, the diagnostic module 120 may be capable of providing some or all of the device data and local converter data to the control module 125. The diagnostic module 120 may also be capable of analyzing the data in any suitable manner and providing the analysis results to the operator and/or the control module 125. For example, the diagnostic module 120 may be capable of determining statistics for each panel 102 based on any suitable time frame, such as hourly, daily, weekly and monthly.

The diagnostic module 120 may also be capable of providing fault monitoring for the array 106. Based on the data received from the local converters 104, the diagnostic module 120 may identify one or more defective panels 102, such as panels 102 that have failed, have malfunctioned, are shaded, are dirty and/or the like. The diagnostic module 120 may also notify an operator when a defective panel 102 should be replaced, repaired or cleaned.

The control module 125 is capable of actually controlling the array 106 by sending control signals to one or more local converters 104. For example, the control module 125 may send a circumvent control signal to a particular local converter 104 with a malfunctioning corresponding panel 102. The circumvent control signal prompts that local converter 104 to circumvent its panel 102, effectively removing the panel 102 from the array 106 without affecting the operation of other panels 102 in the same string 114 as the circumvented panel 102.

In addition, the control module 125 may be capable of sending control signals to one or more local converters 104 that direct the local converters 104 to adjust their output voltages or currents. For some embodiments, the MPPT functionality of the local converters 104 may be moved to the central array controller 110. For these embodiments, the control module 125 is also capable of calibrating the MPP of each panel 102 and sending a conversion ratio command to each local converter 104 based on the calibration in order to cause each panel 102 to operate at its own MPP, as determined by the control module 125.

The control module 125 may also be capable of receiving and acting on instructions from an operator. For example, the operator may direct the control module 125 that the system 100 is to go on-grid or off-grid, and the control module 125 may respond by placing the system 100 on-grid or taking the system 100 off-grid.

Thus, by implementing a central array controller 110, the photovoltaic system 100 provides better utilization on a per-panel basis. Also, this system 100 provides increased flexibility by making the mixing of different sources possible. The central array controller 110 also provides better protection and data gathering for the entire system 100.

Figure 2:
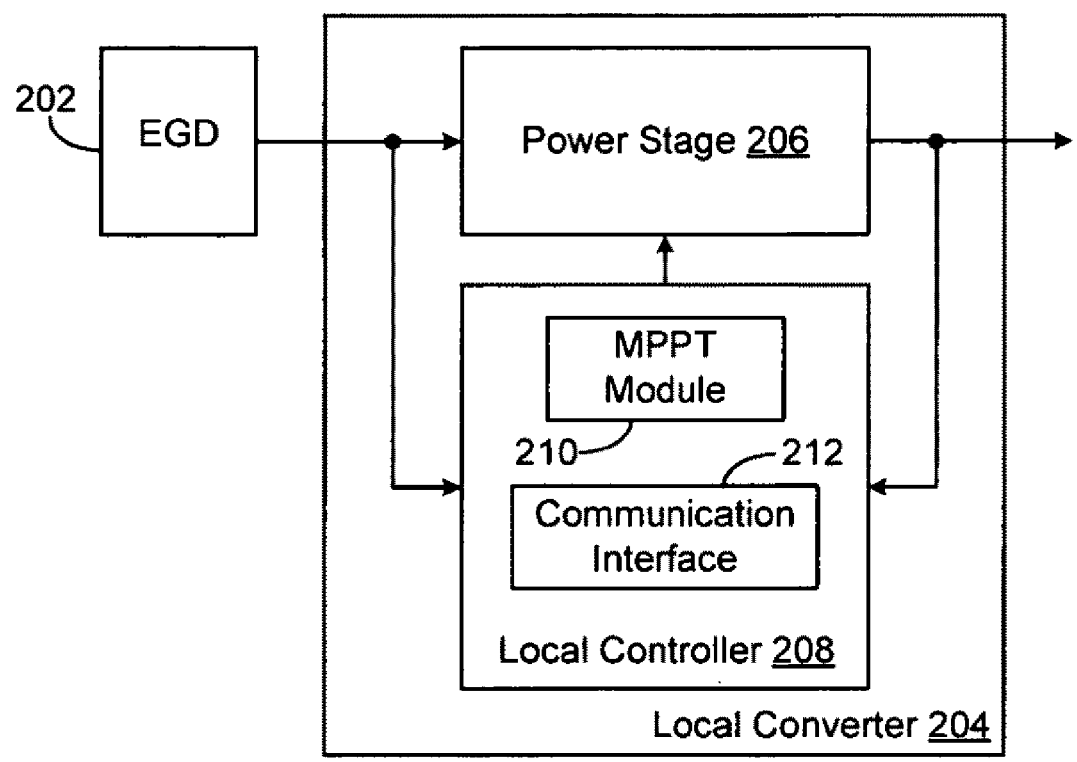
FIG. 2 illustrates the local converter of FIG. 1A or 1B in accordance with one embodiment of this disclosure.

FIG. 2 illustrates a local converter 204 in accordance with one embodiment of this disclosure. The local converter 204 may represent one of the local converters 14 of FIG. 1A or one of the local converters 104 of FIG. 1B; however, it will be understood that the local converter 204 may be implemented in any suitably arranged energy generating system without departing from the scope of this disclosure. In addition, although shown as coupled to an energy generating device 202 that is referred to as a PV panel, it will be understood that the local converter 204 may be coupled to a single cell of a PV panel or a subset of panels in a photovoltaic array or to another energy generating device 202, such as a wind turbine, a fuel cell or the like.

The local converter 204 comprises a power stage 206 and a local controller 208, which further comprises an MPPT module 210 and an optional communication interface 212. The power stage 206 may comprise a DC-DC converter that is capable of receiving as inputs a panel voltage and current from the PV panel 202 and reshaping the voltage-to-current relationship of the inputs to generate an output voltage and current.

The communication interface 212 of the local controller 208 is capable of providing a communication channel between the local converter 204 and a central array controller, such as the central array controller 110 of FIG. 1B. However, for embodiments in which the local converter 204 does not communicate with a central array controller, the communication interface 212 may be omitted.

The MPPT module 210 is capable of receiving as inputs the panel voltage and current from the panel 202 and, if needed by the implemented algorithm, the output voltage and current from the power stage 206. Based on these inputs, the MPPT module 210 is capable of providing a signal to control the power stage 206. In this way, the MPPT module 210 of the local controller 208 is capable of providing MPPT for the PV panel 202.

By providing MPPT, the MPPT module 210 keeps the corresponding panel 202 functioning at an essentially fixed operating point (i.e., a fixed voltage $V_{pan}$ and current $I_{pan}$ corresponding to the maximum power point of the panel 202). Thus, for a given fixed solar irradiance, in steady state, the input power for the local converter 204 is fixed (i.e., $P_{pan} = V_{pan} \cdot I_{pan}$) as it corresponds to a relative or absolute maximum power point of the panel 202. In addition, the local converter 204 has a relatively high efficiency; therefore, the output power is approximately equal to the input power (i.e., $P_{out} \approx P_{pan}$).

Figure 3:
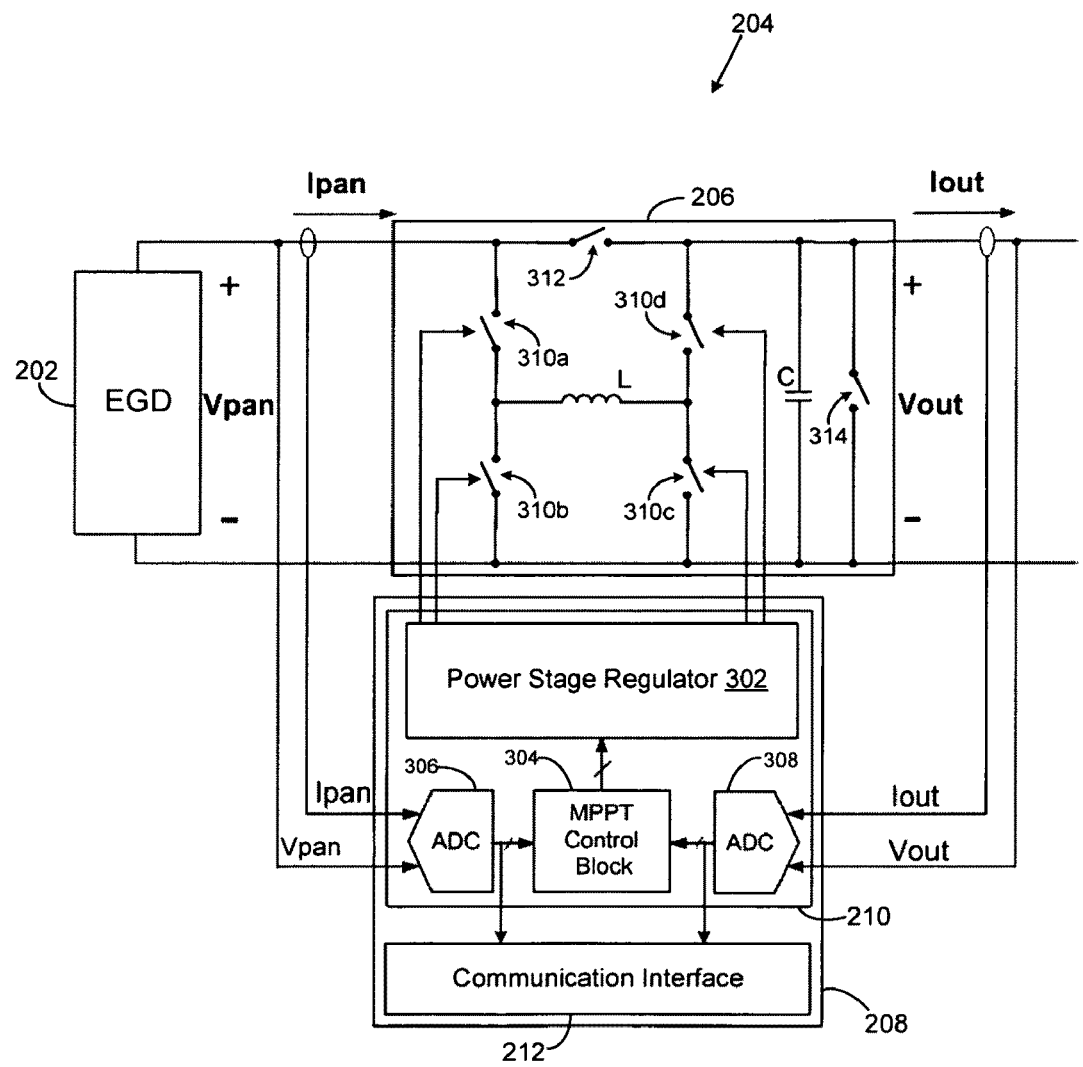
FIG. 3 illustrates details of the local converter of FIG. 2 in accordance with one embodiment of this disclosure.

FIG. 3 illustrates details of the local converter 204 in accordance with one embodiment of this disclosure. For this embodiment, the power stage 206 is implemented as a single-inductor, four-switch synchronous buck-boost switching regulator, and the MPPT module 210 comprises a power stage regulator 302, an MPPT control block 304, and two analog-to-digital converters (ADCs) 306 and 308.

The ADC 306 is capable of scaling and quantizing the analog panel voltage, $V_{pan}$, and the analog panel current, $I_{pan}$, to generate a digital panel voltage and a digital panel current, respectively. Although illustrated and described as a panel voltage and a panel current, it will be understood that $V_{pan}$ may refer to an output device voltage and $I_{pan}$ may refer to an output device current for any suitable energy generating device 202, such as a wind turbine, a fuel cell or the like. The ADC 306, which is coupled to the MPPT control block 304 and the communication interface 212, is also capable of providing the digital panel voltage and current signals to both the MPPT control block 304 and the communication interface 212. Similarly, the ADC 308 is capable of scaling and quantizing the analog output voltage and the analog output current to generate a digital output voltage and a digital output current, respectively. The ADC 308, which is also coupled to the MPPT control block 304 and the communication interface 212, is capable of providing the digital output voltage and current signals to both the MPPT control block 304 and the communication interface 212. The communication interface 212 is capable of providing the digital panel voltage and current signals generated by the ADC 306 and the digital output voltage and current signals generated by the ADC 308 to a central array controller.

The MPPT control block 304, which is coupled to the power stage regulator 302, is capable of receiving the digital panel voltage and current from the ADC 306 and the digital output voltage and current from the ADC 308. Based on at least some of these digital signals, the MPPT control block 304 is capable of generating a conversion ratio command for the power stage regulator 302. The conversion ratio command comprises a conversion ratio for the power stage regulator 302 to use in operating the power stage 206. For embodiments in which the MPPT control block 304 is capable of generating the conversion ratio command based on the digital panel voltage and current and not based on the digital output voltage and current, the ADC 308 may provide the digital output voltage and current to only the communication interface 212 and not the MPPT control block 304.

For some embodiments, the power stage regulator 302 comprises a buck-boost mode control logic and digital pulse width modulator. This power stage regulator 302 is capable of operating the power stage 206 in different modes by generating pulse width modulation (PWM) signals based on the conversion ratio provided by the MPPT control block 304, which is capable of calibrating the conversion ratio of the PWM signals for the power stage 206.

The power stage regulator 302 is coupled to the power stage 206 and is capable of operating the power stage 206 based on the conversion ratio from the MPPT control block 304 by operating the power stage 206 using a duty cycle and a mode that are determined based on the conversion ratio. For the illustrated embodiment in which the power stage 206 is implemented as a buck-boost converter, the possible modes for the power stage 206 may comprise a buck mode, a boost mode, a buck-boost mode, a bypass mode and a shutdown mode.

For this embodiment, the power stage regulator 302 is capable of operating the power stage 206 in the buck-boost mode when the conversion ratio, CR, is within a buck-boost range, in the buck mode when the CR is less than the buck-boost range, and in the boost mode when the CR is greater than the buck-boost range. The buck-boost range includes values that are substantially equal to 1. For example, for a particular embodiment, the buck-boost range may comprise 0.95 to 1.05. When the power stage 206 is in the buck mode, if the CR is less than a maximum buck conversion ratio, $CR_{buck,max}$, the power stage regulator 302 is capable of operating the power stage 206 entirely in a buck configuration. Similarly, when the power stage 206 is in the boost mode, if the CR is greater than a minimum boost conversion ratio, $CR_{boost,min}$, the power stage regulator 302 is capable of operating the power stage 206 entirely in a boost configuration.

Finally, the power stage regulator 302 is capable of alternately operating the power stage 206 in the buck configuration and the boost configuration when the conversion ratio is greater than $CR_{buck,max}$ and less than $CR_{boost,min}$. In this situation, the power stage regulator 302 may perform time-division multiplexing to alternate between the buck configuration and the boost configuration. Thus, when the conversion ratio is closer to $CR_{buck,max}$, the power stage regulator 302 may operate the power stage 206 in the buck configuration more often than the boost configuration. Similarly, when the conversion ratio is closer to $CR_{boost,min}$, the power stage regulator 302 may operate the power stage 206 in the boost configuration more often than the buck configuration. When the conversion ratio is near the midpoint between $CR_{buck,max}$ and $CR_{boost,min}$, the power stage regulator 302 may operate the power stage 206 in the buck configuration about as often as the boost configuration. For example, when the power stage 206 is in the buck-boost mode, the power stage regulator 302 may evenly alternate operating the power stage 206 in the buck configuration and the boost configuration.

For the illustrated embodiment, the power stage 206 comprises four switches 310a-d, as well as an inductor L and a capacitor C. For some embodiments, the switches 310 may comprise N-channel power MOSFETs. For a particular embodiment, these transistors may comprise Gallium Nitride-on-silicon devices. However, it will be understood that the switches 310 may be otherwise suitably implemented without departing from the scope of this disclosure. In addition, the power stage 206 may comprise one or more drivers (not shown in FIG. 3) for driving the switches 310 (e.g., the gates of the transistors). For example, for a particular embodiment, a first driver may be coupled between the power stage regulator 302 and transistors 310a and 310b to drive the gates of transistors 310a and 310b, while a second driver may be coupled between the power stage regulator 302 and transistors 310c and 310d to drive the gates of transistors 310c and 310d. For this embodiment, the PWM signals generated by the power stage regulator 302 are provided to the drivers, which drive the gates of their respective transistors 310 based on those PWM signals.

For the illustrated embodiment, in operating the power stage 206, the power stage regulator 302 is capable of generating digital pulses to control the switches 310 of the power stage 206. For the embodiment described below, the switches 310 comprise transistors. For the buck configuration, the power stage regulator 302 turns transistor 310c off and transistor 310d on. The pulses then alternately turn on and off transistor 310a and transistor 310b such that the power stage 206 is operating as a buck regulator. The duty cycle of transistor 310a for this embodiment is equal to the duty cycle, D, included in the conversion ratio command generated by the MPPT control block 304. For the boost mode, the power stage regulator 302 turns transistor 310a on and transistor 310b off. The pulses then alternately turn on and off transistor 310c and transistor 310d such that the power stage 206 is operating as a boost regulator. The duty cycle of transistor 310c for this embodiment is equal to 1-D.

For the buck-boost mode, the power stage regulator 302 performs time-division multiplexing between buck and boost configurations, as described above. The power stage regulator 302 generates control signals for the buck switch pair of transistors 310a and 310b and the boost switch pair of transistors 310c and 310d. The duty cycle for transistor 310a is fixed at the duty cycle corresponding to $CR_{buck,max}$, and the duty cycle for transistor 310c is fixed at the duty cycle corresponding to $CR_{boost,min}$. The ratio between buck-configuration and boost-configuration operation over a specified time period is linearly proportional to D.

The power stage 206 is operated in the buck-boost mode when the output voltage is close to the panel voltage. In this situation, for the illustrated embodiment, the inductor current ripple, as well as stress due to voltage switches, is much lower than that of SEPIC and traditional buck-boost converters. Also, the illustrated power stage 206 achieves a higher efficiency as compared to traditional buck-boost converters.

For some embodiments, as described in more detail below in connection with FIG. 4A, the MPPT control block 304 is capable of operating in one of four modes: dormant, tracking, holding and bypass. When the panel voltage is less than a predetermined primary threshold voltage, the MPPT control block 304 may operate in the dormant mode. While in the dormant mode, the MPPT control block 304 causes the transistors 310a-d to be turned off. For example, for some embodiments, the MPPT control block 304 may be capable of generating a conversion ratio command that prompts the power stage regulator 302 to turn off the transistors 310a-d when the MPPT control block 304 is in the dormant mode. Thus, the power stage 206 is placed in the shutdown mode and the panel 202 is circumvented, effectively removing the panel 202 from the photovoltaic system in which it is implemented.

When the panel voltage rises above the primary threshold voltage, the MPPT control block 304 may operate in the tracking mode. In this mode, the MPPT control block 304 may perform maximum power point tracking for the panel 202 in order to determine an optimum conversion ratio for the power stage regulator 302. Also in this mode, the power stage regulator 302 places the power stage 206 in the buck mode, the boost mode or the buck-boost mode, depending on the currently generated conversion ratio command.

In addition, for some embodiments, the MPPT control block 304 may also comprise a shutdown register that may be modifiable by an operator of the system or any suitable control program, such as a control program implemented in a central array controller, in order to force the MPPT control block 304 to keep the power stage 206 in the shutdown mode. For this embodiment, the MPPT control block 304 does not begin to operate in the tracking mode until both (i) the panel voltage exceeds the primary threshold voltage and (ii) the shutdown register indicates that the MPPT control block 304 may move the power stage 206 out of the shutdown mode.

When the MPPT control block 304 has found the optimum conversion ratio, the MPPT control block 304 may operate in the holding mode for a predefined period of time. In this mode, the MPPT control block 304 may continue to provide to the power stage regulator 302 the same conversion ratio determined to be the optimum conversion ratio in the tracking mode. Also in this mode, as with the tracking mode, the power stage 206 is placed in the buck mode, the boost mode or the buck-boost mode, depending on the optimum conversion ratio provided in the conversion ratio command. After the predefined period of time has passed, the MPPT control block 304 may revert to the tracking mode to ensure that the optimum conversion ratio has not changed or to find a new optimum conversion ratio if conditions for the panel 202 have changed.

As described in more detail below in connection with FIGS. 5-8, when each of the panels, such as the panel 202, in a photovoltaic array are under uniform illumination and there is no mismatch among the panels 202, a central array controller may be capable of placing the MPPT control block 304 and thus the power stage 206 in the bypass mode. In the bypass mode, for some embodiments, transistors 310a and 310d are turned on and transistors 310b and 310c are turned off such that the panel voltage equals the output voltage. For other embodiments, an optional switch 312 may be included in the power stage 206 that is capable of coupling the input port to the output port to cause the output voltage to equal the panel voltage. In this way, when MPPT is not needed locally, the local converter 204 may be essentially removed from the system, thereby maximizing efficiency by decreasing loss associated with the local converter 204 and increasing its lifetime.

Thus, as described above, the MPPT control block 304 may be capable of operating in the dormant mode and placing the power stage 206 in the shutdown mode, which causes the panel 202 to be circumvented. The MPPT control block 304 may also be capable of operating in the tracking mode or the holding mode. In either of these modes, the MPPT control block 304 is capable of placing the power stage 206 in one of the buck mode, the boost mode and the buck-boost mode. Finally, the MPPT control block 304 may be capable of operating in the bypass mode and placing the power stage 206 in the bypass mode, which causes the local converter 204 to be bypassed while allowing the panel 202 to be directly coupled to other panels 202 in the array.

By operating the local converter 204 in this manner, the string current for a string of panels that includes the panel 202 is independent of the individual panel current. Instead, the string current is set by the string voltage and total string power. In addition, a non-shaded panel 202 may continue to operate at a peak power point regardless of the shading conditions of other panels in the string.

For an alternative embodiment, when the MPPT control block 304 has found an optimum conversion ratio, the MPPT control block 304 may operate in the bypass mode instead of the holding mode when the optimum conversion ratio corresponds to the buck-boost mode for the power stage 206. In the buck-boost mode, the output voltage is close to the panel voltage. Therefore, the panel 202 may be operated at close to its maximum power point by bypassing the local converter 204, which increases efficiency. As with the previously described embodiment, the MPPT control block 304 may periodically revert to the tracking mode from this bypass mode in order to verify that the optimum conversion ratio remains within the buck-boost mode range.

For some embodiments, the MPPT control block 304 may be capable of gradually adjusting the conversion ratio for the power stage regulator 302, as opposed to the normal step-wise variation, in order to avoid stress on the transistors, inductor and capacitor of the power stage 206. For some embodiments, the MPPT control block 304 is capable of implementing different MPPT techniques to adjust panel voltage or conductance instead of conversion ratio. Moreover, the MPPT control block 304 is capable of adjusting a reference voltage instead of conversion ratio for dynamic input voltage regulation.

In addition, the MPPT control block 304 is capable of enabling relatively fast and smooth transitions between the shutdown mode and other modes for the power stage 206. The MPPT control block 304 may comprise a non-volatile memory that is capable of storing a previous maximum power point state, such as the conversion ratio or the like. For this embodiment, when the MPPT control block 304 is transitioning to the dormant mode, the maximum power point state is stored in this non-volatile memory. When the MPPT control block 304 subsequently returns to the tracking mode, the stored maximum power point state may be used as an initial maximum power point state. In this way, the transition time between shutdown and other modes may be reduced significantly for the power stage 206.

For some embodiments, the MPPT control block 304 is also capable of providing over power and/or over voltage protection for the local converter 204. The MPPT control block 304 tries to extract maximum power because the signals $V_{pan}$ and $I_{pan}$ are fed forward to the MPPT control block 304 via the ADC 306. The output voltage for the local converter 204 reaches a maximum if there is an open circuit at the power stage 206 output. Therefore, for over power protection, the output current of the local converter 204 may be used as a signal to turn the MPPT control block 304 on and off. For this embodiment, if the output current drops too low, the conversion ratio may be set by the MPPT control block 304 such that the panel voltage is approximately equal to the output voltage.

For over voltage protection, the MPPT control block 304 may have a maximum conversion ratio for the conversion ratio command which the MPPT control block 304 will not exceed. Thus, if the conversion ratio would continue higher past the maximum conversion ratio, the MPPT control block 304 limits the conversion ratio to the maximum value. This ensures that the output voltage will not increase beyond a corresponding maximum value. The value of the maximum conversion ratio may be either fixed or adaptive. For example, adaptive conversion ratio limitation may be achieved by sensing the panel voltage and, according to the conversion ratio of the power stage 206, computing an estimation of the output voltage corresponding to the next programmed value of the conversion ratio.

In addition, for the illustrated embodiment, the power stage 206 comprises an optional unidirectional switch 314. This optional switch 314 may be included to allow the panel 202 to be circumvented when the power stage 206 is in the shutdown mode, thereby removing the panel 202 from the array while allowing other panels 202 to continue operating. For a particular embodiment, the unidirectional switch 314 may comprise a diode. However, it will be understood that the unidirectional switch 314 may comprise any other suitable type of unidirectional switch without departing from the scope of this disclosure.

Figure 4A:
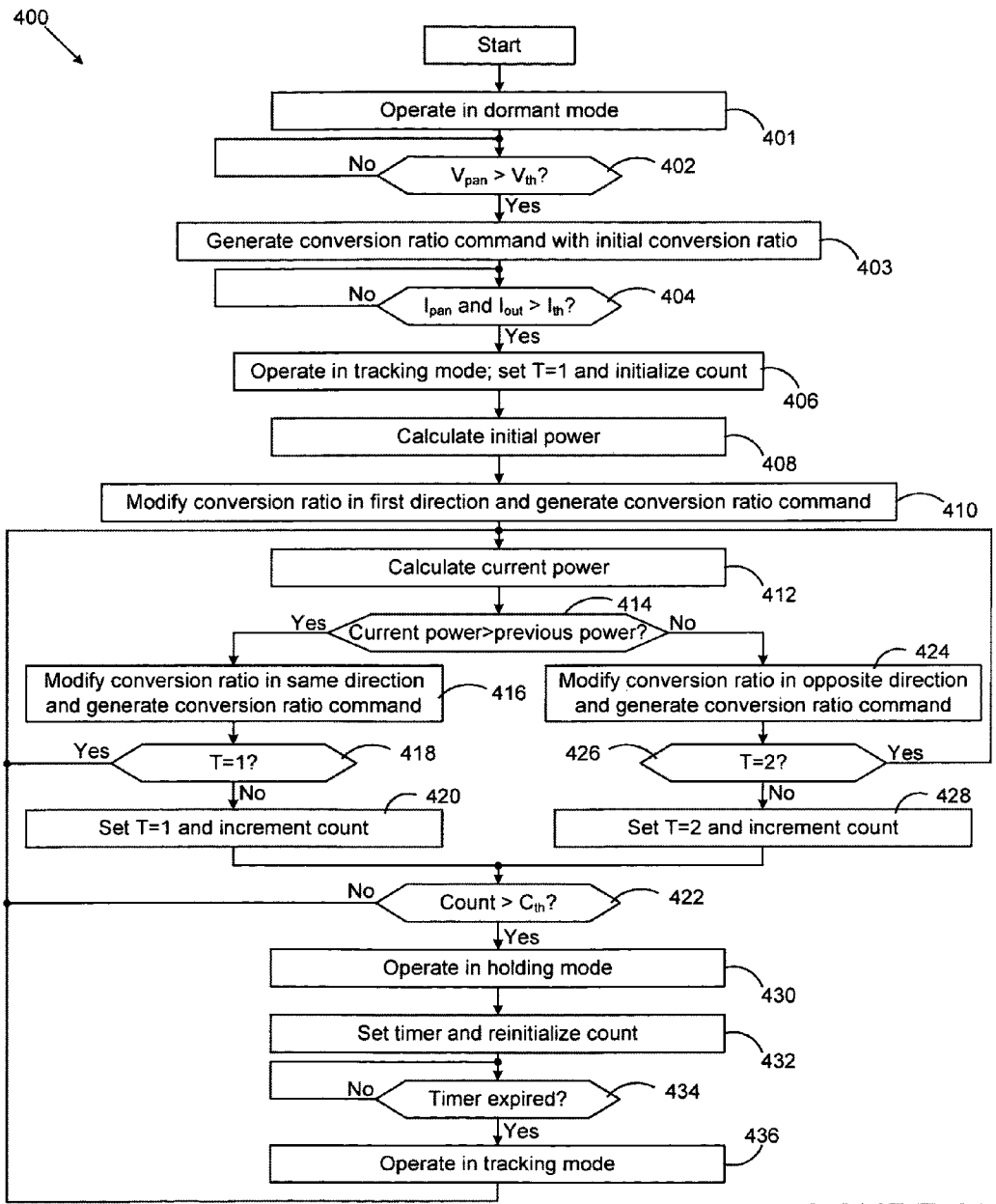
FIG. 4A illustrates a method for implementing MPPT in the local converter of FIG. 2 in accordance with one embodiment of this disclosure.

FIG. 4A illustrates a method 400 for implementing MPPT in the local converter 204 in accordance with one embodiment of this disclosure. The embodiment of the method 400 is for illustration only. Other embodiments of the method 400 may be implemented without departing from the scope of this disclosure.

The method 400 begins with the MPPT control block 304 operating in the dormant mode (step 401). For example, the MPPT control block 304 may generate a conversion ratio command to prompt the power stage regulator 302 to turn off the transistors 310a-d of the power stage 206, thereby placing the power stage 206 in the shutdown mode and circumventing the panel 202.

While in the dormant mode, the MPPT control block 304 monitors the panel voltage, $V_{pan}$, and compares the panel voltage to a primary threshold voltage, $V_{th}$ (step 402). For example, the ADC 306 may convert the panel voltage from an analog signal to a digital signal and provide the digital panel voltage to the MPPT control block 304, which stores the primary threshold voltage for comparison to the digital panel voltage.

As long as the panel voltage remains below the primary threshold voltage (step 402), the MPPT control block 304 continues to operate in the dormant mode. In addition, as described above, the MPPT control block 304 may remain in the dormant mode when a shutdown register indicates that the power stage 206 is to remain in the shutdown mode. However, once the panel voltage exceeds the primary threshold voltage (step 402), the MPPT control block 304 generates a conversion ratio command for operating the power stage 206 that includes an initial conversion ratio (step 403). For example, for one embodiment, the MPPT control block 304 may begin with a conversion ratio of 1. Alternatively, the MPPT control block 304 may be capable of storing an optimum conversion ratio determined during a previous tracking mode. For this embodiment, the MPPT control block 304 may initialize the conversion ratio to be the same as the previously determined optimum conversion ratio. Also, the conversion ratio command generated by the MPPT control block 304 is provided to the power stage regulator 302, which operates the power stage 206 using the initial conversion ratio.

At this point, the MPPT control block 304 monitors the panel current, $I_{pan}$, and output current, $I_{out}$, and compares the panel current and output current to a threshold current, $I_{th}$ (step 404). For example, the ADC 306 may convert the panel current from an analog signal to a digital signal and provide the digital panel current to the MPPT control block 304 and the ADC 308 may convert the output current from an analog signal to a digital signal and provide the digital output current to the MPPT control block 304, which stores the threshold current for comparison to the digital panel current and the digital output current. As long as at least one of these currents, $I_{pan}$ and $I_{out}$, remains below the threshold current (step 404), the MPPT control block 304 continues to monitor the current levels. However, once both of these currents exceed the threshold current (step 404), the MPPT control block 304 begins to operate in the tracking mode, which includes initially setting a tracking variable, T, to 1 and initializing a count (step 406).

Although not shown in the method 400 of FIG. 4A, it will be understood that the MPPT control block 304 may continue to monitor the panel voltage while in the tracking mode and compare the panel voltage to a secondary threshold voltage that is less than the primary threshold voltage. If the panel voltage drops below this secondary threshold voltage, the MPPT control block 304 may revert to the dormant mode. By using a secondary threshold voltage that is less than the primary threshold voltage, the MPPT control block 304 is provided with noise immunity, which prevents the MPPT control block 304 from frequently switching between the dormant and tracking modes.

After setting the value of the tracking variable and initializing the count, the MPPT control block 304 calculates an initial power for the panel 202 (step 408). For example, the ADC 306 may provide the digital panel current and panel voltage signals ($I_{pan}$ and $V_{pan}$) to the MPPT control block 304, which then multiplies these signals together to determine an initial value for the device (or panel) power ($I_{pan} \cdot V_{pan}$).

After calculating an initial power, the MPPT control block 304 modifies the conversion ratio in a first direction and generates a conversion ratio command comprising the modified conversion ratio (step 410). For example, for some embodiments, the MPPT control block 304 may increase the conversion ratio. For other embodiments, the MPPT control block 304 may decrease the conversion ratio. After giving the system time to stabilize, the MPPT control block 304 then calculates the current power for the panel 202 (step 412). For example, the ADC 306 may provide the digital panel current and panel voltage signals to the MPPT control block 304, which then multiplies these signals together to determine a current value for the panel power.

The MPPT control block 304 then compares the currently calculated power to the previously calculated power, which is initially the initial power (step 414). If the current power is greater than the previous power (step 414), the MPPT control block 304 modifies the conversion ratio in the same direction as the previous modification and generates an updated conversion ratio command (step 416). For some embodiments, the conversion ratio is modified higher or lower in same-size increments. For other embodiments, the conversion ratio may be modified higher or lower in linear or non-linear increments to optimize system response. For example, if the conversion ratio is far from an optimum value, using larger increments initially followed by smaller increments as the optimum value is approached may be desirable for some systems.

The MPPT control block 304 also determines whether the tracking variable, T, is equal to 1, indicating that the conversion ratio was modified in the same direction for the previous calculation as it was modified for the calculation prior to the previous calculation (step 418). Thus, when T equals 1, the panel power has increased with a previous modification of the conversion ratio in the same direction. In this case, after giving the system time to stabilize, the MPPT control block 304 again calculates a current power for the panel 202 (step 412) and compares it to the previous power (step 414). However, if the MPPT control block 304 determines that T is not equal to 1, indicating that the conversion ratio was modified in the opposite direction for the previous calculation as it was modified for the calculation prior to the previous calculation (step 418), the MPPT control block 304 sets T to 1 and increments the count (step 420).

The MPPT control block 304 then determines whether the count has exceeded a count threshold, $C_{th}$ (step 422). If the count threshold is not exceeded by the current value of the count (step 422), after giving the system time to stabilize, the MPPT control block 304 again calculates a current power for the panel 202 (step 412) and compares it to the previous power (step 414) to determine if the panel power is increasing or decreasing.

If the MPPT control block 304 determines that the current power is not greater than the previous power (step 414), the MPPT control block 304 modifies the conversion ratio in the opposite direction as the previous modification and generates an updated conversion ratio command (step 424). The MPPT control block 304 also determines whether the tracking variable, T, is equal to 2, indicating that the conversion ratio was modified in the opposite direction for the previous calculation as it was modified for the calculation prior to the previous calculation (step 426). In this case, after giving the system time to stabilize, the MPPT control block 304 again calculates a current power for the panel 202 (step 412) and compares it to the previous power (step 414).

However, if the MPPT control block 304 determines that T is not equal to 2, indicating that the conversion ratio was modified in the same direction for the previous calculation as it was modified for the calculation prior to the previous calculation (step 426), the MPPT control block 304 sets T to 2 and increments the count (step 428). The MPPT control block 304 then determines whether the count has exceeded the count threshold, $C_{th}$ (step 422), as described above.

If the count does exceed the count threshold (step 422), indicating that the conversion ratio has been modified alternately in the first direction and a second direction for a number of times greater than the count threshold, the MPPT control block 304 has found the optimum conversion ratio that corresponds to the maximum power point for the panel 202, and the MPPT control block 304 begins to operate in the holding mode (step 430).

While in the holding mode, the MPPT control block 304 may set a timer and reinitialize the count (step 432). When the timer expires (step 434), the MPPT control block 304 may revert to the tracking mode (step 436) and calculate a current power (step 412) to compare to the last power calculated when the MPPT control block 304 was previously in the tracking mode (step 414). In this way, the MPPT control block 304 may ensure that the optimum conversion ratio has not changed or may find a different optimum conversion ratio if conditions for the panel 202 have changed.

Although FIG. 4A illustrates an example of a method 400 for tracking a maximum power point for an energy generating device 202, various changes may be made to this method 400. For example, although the method 400 is described with reference to a photovoltaic panel, the method 400 may be implemented for other energy generating devices 202, such as wind turbines, fuel cells or the like. Furthermore, although the method 400 is described with reference to the MPPT control block 304 of FIG. 3, it will be understood that the method 400 may be implemented in any suitably arranged MPPT control block without departing from the scope of this disclosure. In addition, for some embodiments, the MPPT control block 304 may operate in the dormant mode instead of the holding mode in step 430 if the MPPT control block 304 determines that the optimum conversion ratio corresponds to the buck-boost mode for the power stage 206. For these embodiments, the amount of time after which the timer expires during the dormant mode may be the same as or different from the amount of time associated with the timer during the holding mode. Also, while shown as a series of steps, the steps in the method 400 may overlap, occur in parallel, occur multiple times, or occur in a different order.

Figure 4B:
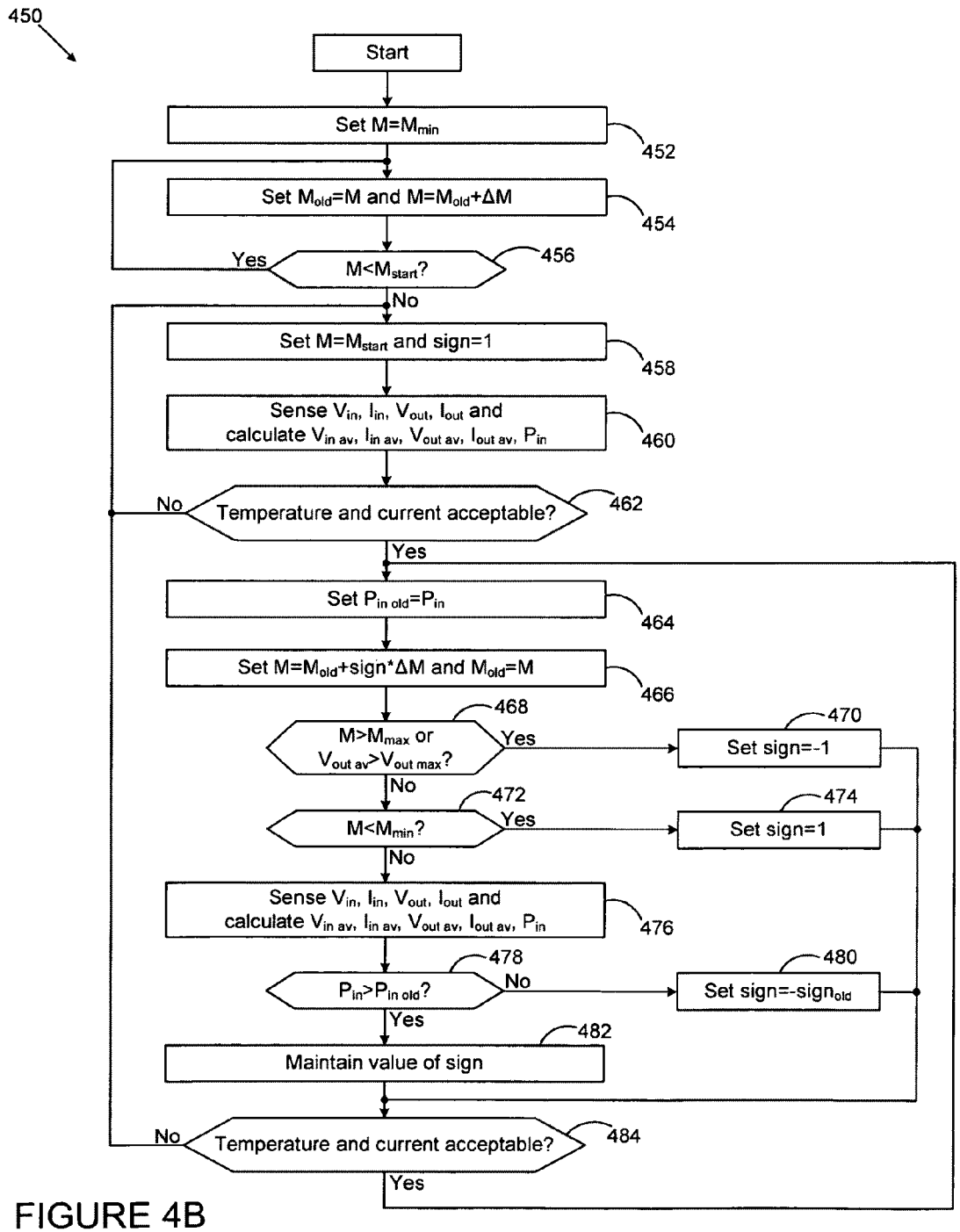
FIG. 4B illustrates a method for implementing MPPT in the local converter of FIG. 2 in accordance with another embodiment of this disclosure.

FIG. 4B illustrates a method 450 for implementing MPPT in the local converter 204 in accordance with another embodiment of this disclosure. For one particular embodiment, the method 450 of FIG. 4B may correspond to a portion of the method 400 of FIG. 4A. For example, the steps described with respect to the method 450 may generally correspond to steps 403, 408, 410, 412, 414, 416 and 424 of the method 400. However, additional details with regard to those steps are included in the method 450. For another particular embodiment, the method 450 may be implemented independently of the method 400 and is not limited by the implementation described above with respect to the method 400. In addition, as with the method 400, the embodiment of the method 450 described below is for illustration only. Other embodiments of the method 450 may be implemented without departing from the scope of this disclosure.

The method 450 begins with a start-up sequence that includes steps 452, 454 and 456. Initially, the MPPT control block 304 sets the converter conversion ratio, M, to a minimum conversion ratio, $M_{min}$ (step 452). Then the MPPT control block 304 sets a previous converter conversion ratio, $M_{old}$, which is the conversion ratio used during the last MPPT iteration, to M, and the conversion ratio, M, for the current MPPT iteration to $M_{old}+\Delta M$, where $\Delta M$ provides the incremental difference in the conversion ratio for each iteration (step 454). If the value of M set in this step is less than the value of an initial conversion ratio, $M_{start}$, to be used in performing MPPT (step 456), then $M_{old}$ and M are both updated as previously described, resulting in both values being increased by $\Delta M$ (step 454). Once the value of M has reached or surpassed the value of $M_{start}$ (step 456), the start-up sequence is completed and the method continues with step 458.

The MPPT control block 304 sets the value of M to $M_{start}$ and the value of "sign," which provides a direction for the MPPT perturbation in each iteration of the MPPT process, to 1 (step 458). At this point, the MPPT control block 304 senses an input voltage and current ($V_{in}$ and $I_{in}$) provided by the ADC 306 and senses an output voltage and current ($V_{out}$ and $I_{out}$) provided by the ADC 308 (step 460). The MPPT control block 304 also calculates average input voltage and current ($V_{in\,av}$ and $I_{in\,av}$) and average output voltage and current ($V_{out\,av}$ and $I_{out\,av}$), followed by input power, which is calculated as $V_{in\,av}*I_{in\,av}$ (step 460).

For some embodiments, the average input voltage and current and the average output voltage and current are calculated over the second half of the MPPT perturbation interval. For a particular embodiment having a 50 MHz clock, the input voltage and current may be sampled at 12.5 kHz, and the average input voltage and current and the average output voltage and current may be calculated at 750 Hz.

The MPPT control block 304 then determines whether or not the temperature and current are acceptable before enabling the MPPT process (step 462). For a particular embodiment, the MPPT control block 304 may comprise an over-temperature pin that is capable of receiving an over-temperature signal when the temperature exceeds a pre-defined threshold. For this embodiment, when the over-temperature signal indicates that the threshold has been exceeded, the MPPT control block 304 determines that the temperature is unacceptable.

For a particular embodiment, the MPPT control block 304 may determine whether or not the current is acceptable by comparing the output current, $I_{out}$, and the average input current, $I_{in\,av}$, to an upper minimum current threshold, $I_{min\,hi}$, to ensure that the output current and the average input current are each high enough before beginning the MPPT process and by comparing the average output current, $I_{out\,av}$, to a maximum output current, $I_{out\,max}$, to ensure that the average output current is not too high. For this embodiment, when both the output current and the average input current are greater than the upper minimum current threshold and when the average output current is less than the maximum output current, the MPPT control block 304 determines that the current is acceptable. Alternatively, when either the output current or the average input current are less than the upper minimum current threshold or when the average output current is greater than the maximum output current, the MPPT control block 304 determines that the current is unacceptable.

For this particular embodiment, the MPPT control block 304 may also comprise an over-current pin that is capable of receiving an over-current signal when the average output current exceeds the maximum output current. For example, the value of the maximum output current may be assigned via a resistive voltage divider to the over-current pin. Then the over-current pin will receive the over-current signal when the maximum output current is exceeded.

When the MPPT control block 304 determines that the temperature and/or the current is unacceptable (step 462), the value of M is reset to $M_{start}$ and the value of "sign" is reset to 1 (step 458). Setting the value of M to $M_{start}$ when the temperature is too high typically results in the panel 202 being operated away from its MPPT, thereby decreasing the power carried by the converter 204. Moreover, $M_{start}$ may be chosen to be an operating point at which losses of the local converter 204 are minimized. For example, for a particular embodiment, $M_{start}$ may be chosen to be 1. Thus, when the temperature is unacceptably high, returning to $M_{start}$ will generally cause a reduction in temperature as a result of the reduced power. In addition, when the average output current is too high due to an output short circuit, setting the value of M to $M_{start}$ results in the panel voltage being forced to zero.

When the MPPT control block 304 determines that the temperature and the current are both acceptable (step 462), the MPPT process is enabled. For the particular embodiment described above, the MPPT control block 304 determines that the temperature and current are acceptable when the temperature and average output current are each low enough and when the output current and average input current are each high enough. This results in the ability to provide start-up and shut-down synchronization between the local converters 204 and the DC-AC converter 22 or 112. For this embodiment, at start-up, each local converter 204 is brought to a fixed conversion ratio and operated in such a state for a time that is sufficient to bring the system 10 or 100 to steady-state. If the DC-AC converter 22 or 112 has not started its operation at this point, the local converters 204 may quickly charge their output capacitors to a fixed voltage. For example, this fixed voltage may be given by the open circuit panel voltage and the initial conversion ratio, $M_{start}$. Once this state is reached, input and output currents of the local converters 204 are virtually zero.

For this embodiment, synchronization may be provided by sensing the output (or input) current of the local converters 204 and allowing MPPT only when the sensed current exceeds a certain threshold. When the DC-AC converter 22 or 112 starts its normal operation, the output (and input) current of the local converters 204 exceed a minimum threshold and all the local converters 204 start their MPPT operation at the same time the DC-AC converter 22 or 112 begins its MPPT operation. Likewise, the same technique provides synchronous shut-down of the local converters 204 when operation of the DC-AC converter 22 or 112 is interrupted for any reason (e.g., islanding).

For the method 450 of FIG. 4B, the MPPT process begins with the value of the previous input power, $P_{in\ old}$, being set to the value of the current input power, $P_{in}$ (step 464). Thus, initially, the previous input power is set to the value of the input power calculated in step 460. The MPPT control block 304 sets the value of M to $M_{old}$+sign*$\Delta M$ and then sets the value of $M_{old}$ to M (step 466). Thus, the conversion ratio is adjusted by the value of $\Delta M$ in the direction specified by the value of "sign," and the resulting conversion ratio is made available for use in a subsequent iteration by changing the value of $M_{old}$ to the same value.

Next, the MPPT control block 304 determines whether the conversion ratio, M, is within a predetermined range and whether the average output voltage is too high. For the illustrated embodiment, the conversion ratio is within the predetermined range when the conversion ratio is less than a maximum conversion ratio, $M_{max}$, and greater than the minimum conversion ratio, $M_{min}$. Also for the illustrated embodiment, the average output voltage is considered too high when it exceeds a maximum output voltage, $V_{out\ max}$.

Thus, if either M is greater than $M_{max}$ or $V_{out\ av}$ is greater than $V_{out\ max}$ (step 468), the MPPT control block 304 sets the value of sign to –1 (step 470), which will result in a decrease in the conversion ratio in a subsequent iteration of the MPPT process if such process continues, as described in more detail below. Similarly, if M is less than $M_{min}$ (step 472), the MPPT control block 304 sets the value of sign to 1 (step 474), which will result in an increase in the conversion ratio in a subsequent iteration of the MPPT process if such process continues, as described in more detail below.

Therefore, when the average output voltage is greater than the maximum output voltage (step 470), instead of simply turning off the switches in the conversion stage, the local converter 204 is allowed to continue operating while being prevented by the MPPT control block 304 from exceeding the maximum output voltage through the decrease in the conversion ratio. This has the advantage of allowing energy harvesting even in dramatic mismatch conditions that might normally cause the average output voltage to exceed the voltage ratings of some components.

At this point, the MPPT control block 304 senses the input voltage and current ($V_{in}$ and $I_{in}$) provided by the ADC 306 and senses the output voltage and current ($V_{out}$ and $I_{out}$) provided by the ADC 308 (step 476). The MPPT control block 304 also calculates the average input voltage and current ($V_{in\ av}$ and $I_{in\ av}$) and the average output voltage and current ($V_{out\ av}$ and $I_{out\ av}$), followed by input power, which is calculated as $V_{in\ av}*I_{in\ av}$ (step 476).

The MPPT control block 304 then determines whether this current input power, $P_{in}$, is greater than the previous input power, $P_{in\ old}$, which was calculated in an immediately previous iteration (step 478). If the current input power is not greater than the previous input power (step 478), the MPPT control block 304 changes the value of "sign" by setting sign to $-sign_{old}$, where $sign_{old}$ is simply the current value of sign before being multiplied by –1 (step 480). Thus, the conversion ratio will be modified in a different direction in a subsequent iteration of the MPPT process as compared to the direction of modification in the current iteration if the MPPT process continues, as described in more detail below.

If the current input power is greater than the previous input power (step 478), the MPPT control block 304 maintains the value of "sign" (step 482). Thus, the conversion ratio will be modified in the same direction in a subsequent iteration of the MPPT process as compared to the direction of modification in the current iteration if the MPPT process continues, as described in more detail below.

The MPPT control block 304 determines whether or not the temperature and current are acceptable for continuing the MPPT process (step 484). For the particular embodiment described above in which the MPPT control block 304 comprises an over-temperature pin, the MPPT control block 304 may determine that the temperature is unacceptable when the over-temperature signal indicates that the threshold has been exceeded.

For a particular embodiment, the MPPT control block 304 may determine whether or not the current is acceptable by comparing the output current, $I_{out}$, and the average input current, $I_{in\ av}$, to a lower minimum current threshold, $I_{min\ low}$, to ensure that the output current and the average input current are each high enough before continuing the MPPT process and by comparing the average output current, $I_{out\ av}$, to the maximum output current, $I_{out\ max}$, to ensure that the average output current is not too high. For this embodiment, when the output current and/or the average input current is greater than the lower minimum current threshold and when the average output current is less than the maximum output current, the MPPT control block 304 determines that the current is acceptable. Alternatively, when both the output current and the average input current are less than the lower minimum current threshold or when the average output current is greater than the maximum output current, the MPPT control block 304 determines that the current is unacceptable. By using an upper minimum current threshold for enabling the MPPT process (step 462) and a lower minimum current threshold for disabling the MPPT process (step 484), the MPPT control block 304 prevents multiple starts and stops of the MPPT process that could occur if the output current and the average input current were near a single current threshold that was used for both enabling and disabling the MPPT process.

When the MPPT control block 304 determines that the temperature and/or the current is unacceptable (step 484), the MPPT process is disabled. At this point, the value of M is reset to $M_{start}$ and the value of "sign" is reset to 1 (step 458), and the method continues as previously described. When the MPPT control block 304 determines that both the temperature and the current are acceptable (step 484), the value of the previous input power, $P_{in\ old}$, is set to the value of the current input power, $P_{in}$ (step 464), and the MPPT control block 304 begins a subsequent iteration of the MPPT process as previously described.

Although FIG. 4B illustrates an example of a method 450 for implementing MPPT for an energy generating device 202, various changes may be made to this method 450. For example, although the method 450 is described with reference to a photovoltaic panel, the method 450 may be implemented for other energy generating devices 202, such as wind turbines, fuel cells or the like. Furthermore, although the method 450 is described with reference to the MPPT control block 304 of FIG. 3, it will be understood that the method 450 may be implemented in any suitably arranged MPPT control block without departing from the scope of this disclosure. Also, while shown as a series of steps, the steps in the method 450 may overlap, occur in parallel, occur multiple times, or occur in a different order. For a particular example, it will be understood that the determination by the MPPT control block 304 regarding the acceptability of the temperature and current in step 484 may be performed continuously during the MPPT process instead of once during each iteration as illustrated.

Figure 5:
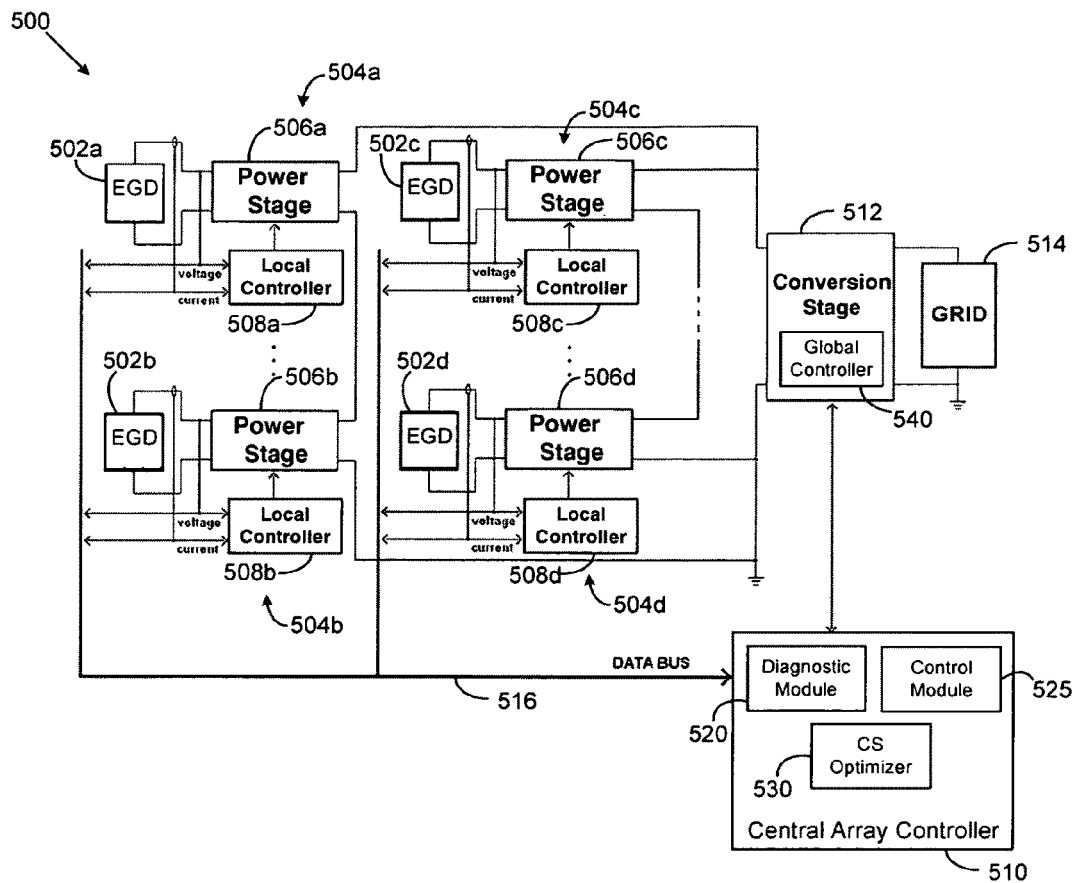
FIG. 5 illustrates an energy generating system including a central array controller capable of selecting between centralized and distributed MPPT for the energy generating system in accordance with one embodiment of this disclosure.

FIG. 5 illustrates an energy generating system 500 including a plurality of energy generating devices 502 and a central array controller 510 that is capable of selecting between centralized and distributed MPPT for the energy generating system 500 in accordance with one embodiment of this disclosure. For the described embodiment, the energy generating system is referred to as a photovoltaic system 500 that comprises an array of photovoltaic panels 502, each coupled to a corresponding local converter 504.

Each local converter 504 comprises a power stage 506 and a local controller 508. In addition, for some embodiments, each local converter 504 may be bypassed via an optional internal switch, such as switch 312. When bypassed, the output voltage of the local converter 504 is essentially equal to its input voltage. In this way, losses associated with the operation of the local converter 504 may be minimized or even eliminated when the local converter 504 is not needed.

In addition to the central array controller 510, the illustrated embodiment of the system 500 may also comprise a conversion stage 512, a grid 514 and a data bus 516. The central array controller 510 comprises a diagnostic module 520, a control module 525 and an optional conversion stage (CS) optimizer 530. In addition, the illustrated embodiment provides for a global controller 540 in the conversion stage 512. However, it will be understood that the global controller 540 may be implemented in the central array controller 510 instead of the conversion stage 512. Also, the CS optimizer 530 may be implemented in the conversion stage 512 instead of the central array controller 510.

For some embodiments, the panels 502 and local converters 504 may represent the panels 102 and local converters 104 of FIG. 1B and/or the panels 202 and local converters 204 of FIG. 2 or 3, the central array controller 510 may represent the central array controller 110 of FIG. 1B, and/or the conversion stage 512 may represent the DC-AC converter 112 of FIG. 1B. In addition, the diagnostic module 520 and the control module 525 may represent the diagnostic module 120 and the control module 125 of FIG. 1B, respectively. However, it will be understood that the components of the system 500 may be implemented in any suitable manner. The conversion stage 512 may comprise a DC-AC converter, a battery charger or other energy storage device, or any other suitable component. The grid 514 may comprise any suitable load capable of operating based on the energy generated by the photovoltaic system 500.

Each of the local controllers 508 is capable of providing device data and local converter data for a corresponding panel 502 to the central array controller 510 over the data bus 516 or, alternatively, over a wireless link. Based on this data, the diagnostic module 520 may be capable of determining whether the panels 502 are operating under quasi-ideal conditions, i.e., the panels 502 are not mismatched and are illuminated essentially the same amount as each other. In this situation, the diagnostic module 520 is capable of prompting the control module 525 to place the system 500 in a centralized MPPT (CMPPT) mode. To accomplish this, the control module 525 is capable of sending a disable signal over the data bus 516 to each of the local controllers 508 in order to disable the local converters 504 by operating the local converters 504 in a bypass mode. The control module 525 is also capable of sending an enable signal to the global controller 540.

In the bypass mode, the local controller 508 no longer performs MPPT, and the output voltage of the power stage 506 is essentially equal to the panel voltage from the panel 502. Thus, losses associated with operating the local converters 504 are minimized and the efficiency of the system 500 is maximized. When the local converters 504 are operating in bypass mode, the global controller 540 is capable of performing CMPPT for the array of panels 502.

The diagnostic module 520 is also capable of determining whether some of the panels 502 may be shaded or mismatched (i.e., some panels 502 have different characteristics as compared to other panels 502 in the array). In this situation, the diagnostic module 520 is capable of prompting the control module 525 to place the system 500 in a distributed MPPT (DMPPT) mode. To accomplish this, the control module 525 is capable of sending an enable signal over the data bus 516 to each of the local controllers 508 in order to enable the local converters 504 by allowing the normal operation of the local converters 504. The control module 525 is also capable of sending a disable signal to the global controller 540.

When some of the panels 502 are shaded, the diagnostic module 520 is also capable of determining that some of the shaded panels 502 may be partially shaded. In this situation, in addition to prompting the control module 525 to place the system 500 in the DMPPT mode, the diagnostic module 520 may also be capable of performing a full diagnostic scan of the system 500 in order to ensure that the local controllers 508 for partially shaded panels 502 are finding their actual maximum power points and not local maxima. For embodiments in which the energy generating devices 502 comprise wind turbines, the diagnostic module 520 may be capable of determining whether some of the wind turbines are "shaded" due to changing wind patterns, hills or other structures blocking wind, or other wind-affecting conditions.

Figure 6:
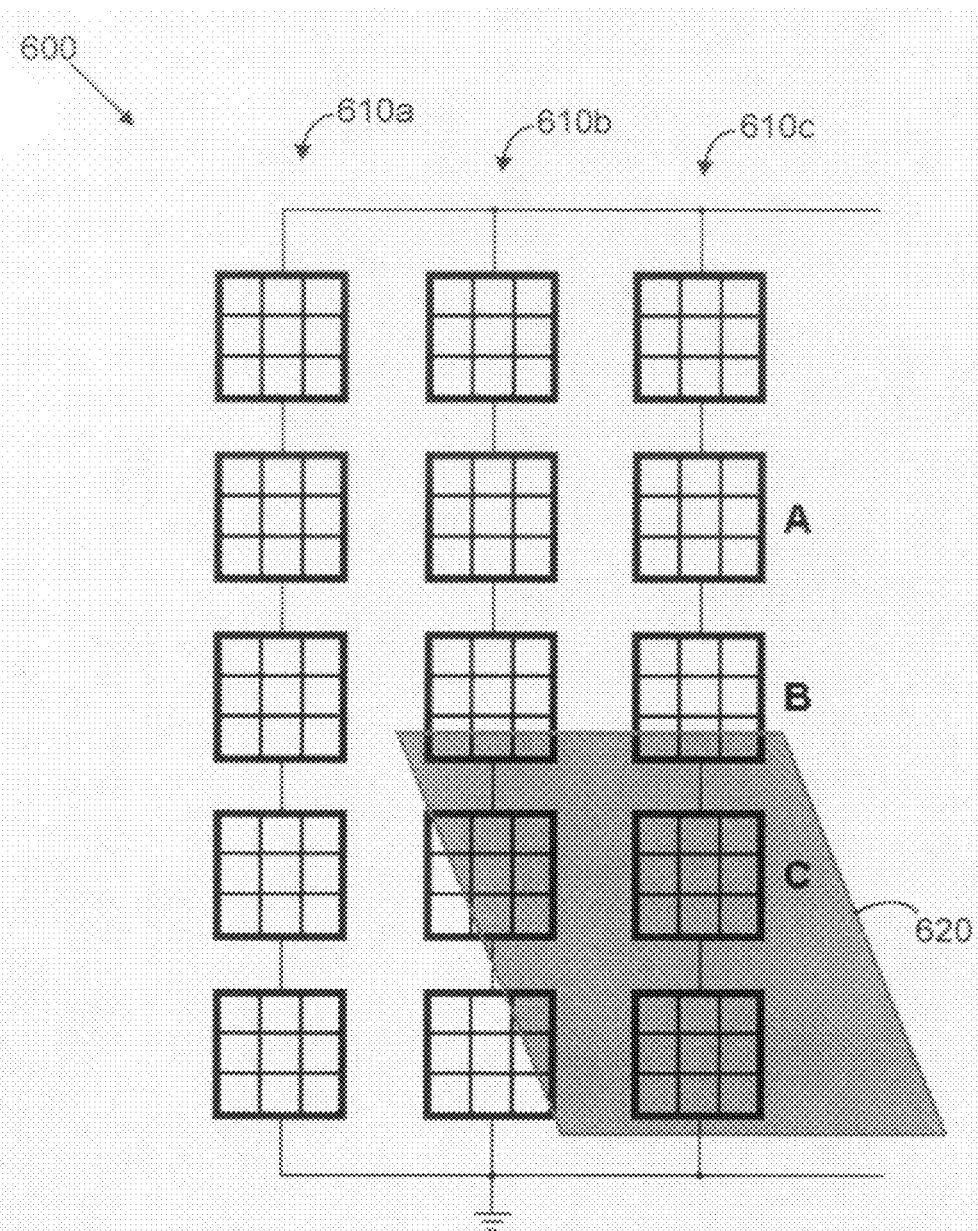
FIG. 6 illustrates the array of FIG. 5 under partially shaded conditions in accordance with one embodiment of this disclosure.
Figure 7A:
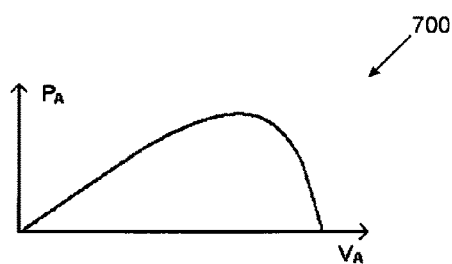
FIGS. 7A-C illustrate voltage-to-power characteristics corresponding to three of the photovoltaic panels of FIG. 6.
Figure 7B:
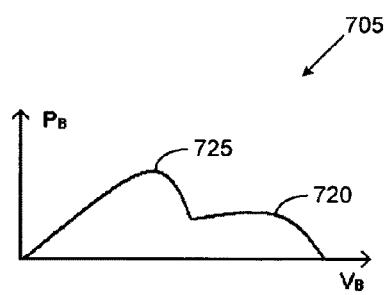
Figure 7C:
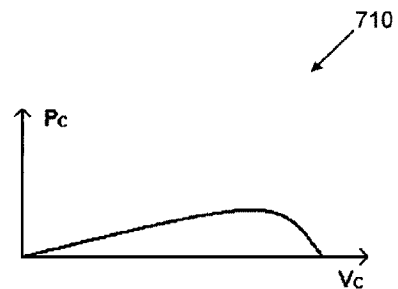

A partially shaded situation for a photovoltaic system 500 is illustrated in FIGS. 6 and 7A-C. FIG. 6 illustrates a photovoltaic array 600 under partially shaded conditions. FIGS. 7A-C are graphs 700, 705 and 710 illustrating voltage-to-power characteristics corresponding to three of the photovoltaic panels of FIG. 6.

The illustrated array 600 comprises three strings 610 of photovoltaic panels. Three of the panels in the string 610c are labeled as panel A, panel B and panel C. It will be understood that these panels may represent the panels 502 of FIG. 5 or panels in any other suitably arranged photovoltaic system. Some of the panels are covered completely or partially by a shaded region 620.

In the illustrated example, panel A is fully illuminated, while panel B is partially shaded and panel C is fully shaded by the shaded region 620. The voltage-to-power characteristics in the graph 700 of FIG. 7A corresponds to panel A, the voltage-to-power characteristics in the graph 705 of FIG. 7B corresponds to panel B, and the voltage-to-power characteristics in the graph 710 of FIG. 7C corresponds to panel C.

Thus, as shown in the graph 705, the partially shaded panel B has a local maximum 720 different from its actual maximum power point 725. The diagnostic module 520 of the central array controller 510 is capable of determining that panel B may be partially shaded and performing a full diagnostic scan to ensure that panel B is being operated by its local controller 508 at its actual maximum power point 725 as opposed to the local maximum 720. A panel 502 that is operating at a local maximum power point, such as point 720, instead of an actual maximum power point, such as point 725, is referred to as an "under-performing" panel 502.

For a particular embodiment, the diagnostic module 520 may identify partially shaded panels 502 as follows. First, the diagnostic module 520 assumes that panels 1, . . . , N are a subset of panels 502 in the considered array with equal characteristics and assumes that $P_{pan,i}$ is the output power of the $i^{th}$ panel 502 belonging to the set [1, . . . , N]. Then, $$P_{pan,max} \geq P_{pan,i} \geq P_{pan,min},$$

where $P_{pan,max}$ is the output power of the best-performing panel 502 and $P_{pan,min}$ is the output power of the worst-performing panel 502.

The diagnostic module 520 also defines a variable $\phi_i$ by the following equation:

$$\varphi_i = \frac{P_{pan\ max} - P_{pan\ i}}{P_{pan\ max}}.$$

The probability that the $i^{th}$ panel 502 is fully or partially shaded can then be expressed as follows:

$$\rho_i = k\varphi_i = \frac{k(P_{pan\ max} - P_{pan\ i})}{P_{pan\ max}},$$

where k is a constant that is less than or equal to 1. Then it follows that $$\rho_{min} \leq \rho_i \leq \rho_{max},$$

where $\rho_{min} = \frac{k(P_{pan\ max} - P_{pan\ max})}{P_{pan\ max}} = 0$ and $$\rho_{max} = \frac{k(P_{pan\ max} - P_{pan\ min})}{P_{pan\ max}}.$$

The diagnostic module 520 also defines $\rho_{DMPPT}$ as the minimum value of the probability function $\rho_{max}$ such that DMPPT is needed. Thus, if $\rho_{max}$ is greater than $\rho_{DMPPT}$, DMPPT will be enabled. In addition, $\rho_{diag}$ is defined as the minimum value of the probability function $\rho_{max}$ such that diagnostic functions are needed to determine whether any panels 502 that may be partially shaded are not operating at their MPPs. Thus, if $\rho_{max}$ is greater than $\rho_{diag}$, the diagnostic module 520 will identify panels 502 that may be partially shaded and will perform the scan on those identified panels 502.

The diagnostic module 520 is capable of enabling DMPPT for even relatively small mismatches among the panels 502, but for larger mismatches the diagnostic module 520 is also capable of performing the full diagnostic scan. As such, the value of $\rho_{DMPPT}$ is generally less than $\rho_{diag}$.

Thus, for some embodiments, the diagnostic module 520 is capable of determining that the system 500 should be in the CMPPT mode when $\rho_{max} < \rho_{DMPPT}$, in the DMPPT mode when $\rho_{DMPPT} < \rho_{max} < \rho_{diag}$, and in the DMPPT mode along with the full diagnostic scan when $\rho_{max} > \rho_{diag}$.

For these embodiments, the full diagnostic scan may comprise a complete scan of the voltage-to-power characteristic of each panel j for which $\rho_j > \rho_{diag}$. The diagnostic module 520 may individually scan the characteristics of each such panel 502 based on a timing given by the central array controller 510. In this way, the conversion stage 512 may continue to operate normally.

When the system 500 is operating in the DMPPT mode, the CS optimizer 530 is capable of optimizing the operating point of the conversion stage 512. For one embodiment, the operating point of the conversion stage 512 may be set to a constant value. However, for the embodiments in which the CS optimizer 530 is implemented, the operating point of the conversion stage 512 may be optimized by the CS optimizer 530.

For a particular embodiment, the CS optimizer 530 may be capable of determining an optimized operating point for the conversion stage 512 as described below. For the $i^{th}$ power stage 506, the duty cycle is defined as $D_i$ and its conversion ratio is defined as $M(D_i)$. The power stages 506 are designed to have a nominal conversion ratio of $M_0$. Thus, operating the power stages 506 as closely to $M_0$ as possible provides a higher efficiency, lowers stress and lowers the possibility of output voltage saturation. For a power stage 506 that comprises a step-up-down converter, $M_0$ may be 1.

Because of this, an optimization principle may be defined as:

$$\frac{\sum_{i=1}^{N} M(D_i)}{N} = M_0.$$

Then, $$\sum_{i=1}^{N} M(D_i) = \sum_{i=1}^{N} \frac{I_{pan,i}}{I_{out,i}} \eta_i \approx \frac{1}{I_{LOAD}} \sum_{i=1}^{N} I_{pan,i},$$

where $I_{pan,i}$ is the input current of the $i^{th}$ power stage 506, $I_{out,i}$ is the output current of the $i^{th}$ power stage 506, $\eta_i$ is the efficiency of the $i^{th}$ power stage 506, and $I_{LOAD}$ is the input current for the conversion stage 512. As a result, the optimization principle may be rewritten as:

$$I_{LOAD} = \frac{\sum_{i=1}^{N} I_{pan\ i}}{NM_0}.$$

The CS optimizer 530 may achieve this optimization by using a standard current mode control technique at the input port of the conversion stage 512 such that the input current of the conversion stage 512 is set to $I_{LOAD}$.

Figure 8:
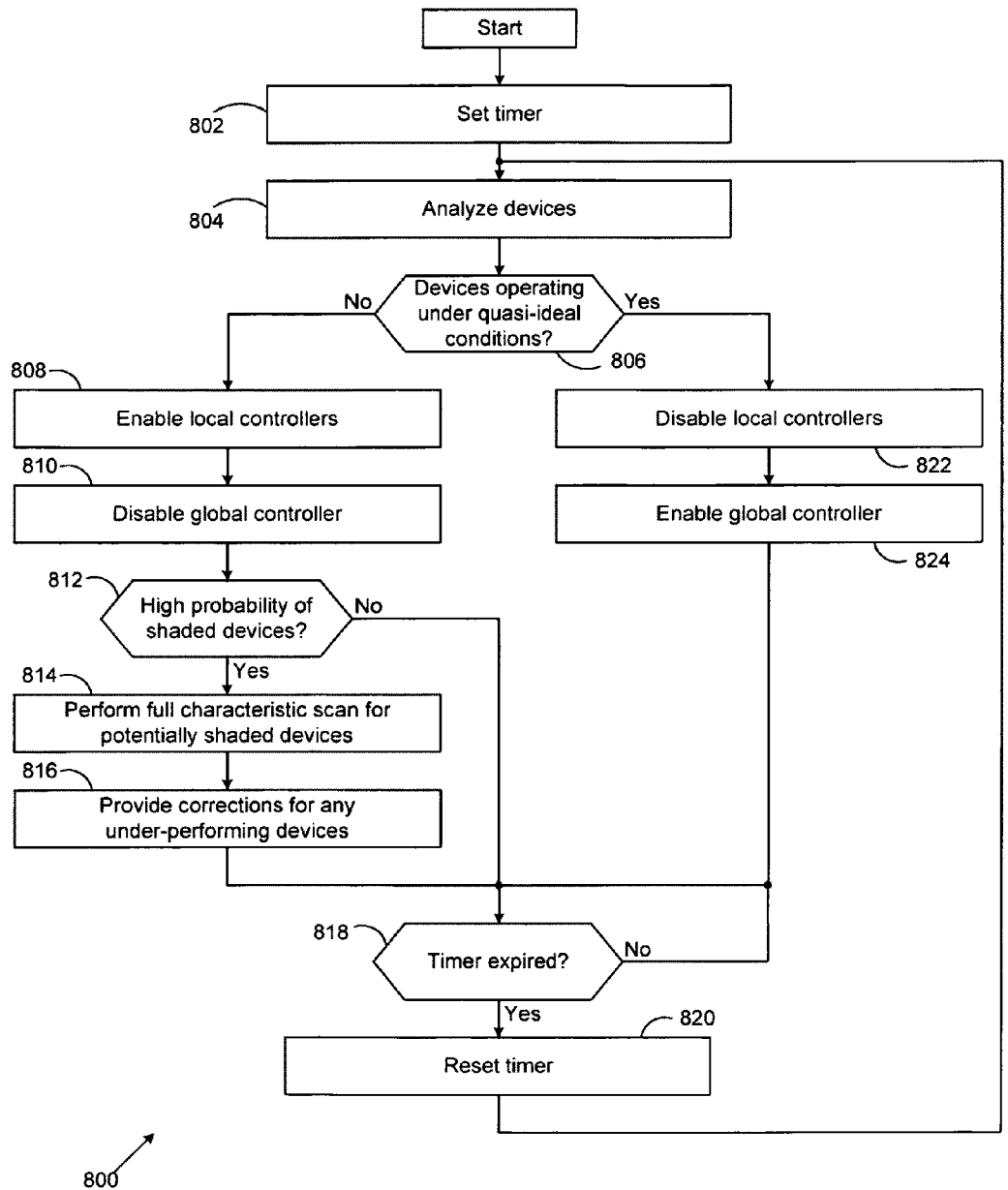
FIG. 8 illustrates a method for selecting between centralized and distributed MPPT for the energy generating system of FIG. 5 in accordance with one embodiment of this disclosure.

FIG. 8 illustrates a method 800 for selecting between centralized and distributed MPPT for the energy generating system 500 in accordance with one embodiment of this disclosure. The embodiment of the method 800 is for illustration only. Other embodiments of the method 800 may be implemented without departing from the scope of this disclosure.

The method 800 begins with the diagnostic module 520 setting a timer (step 802). The timer may be used by the diagnostic module 520 to trigger the initiation of the method 800 on a recurring basis. The diagnostic module 520 then analyzes the energy generating devices, such as panels, 502 in the energy generating system 500 (step 804). For example, for some embodiments, the diagnostic module 520 may analyze the panels 502 by calculating a panel power, $P_{pan}$, for each panel 502 and then determining a number of other values based on these calculated values of $P_{pan}$, as described in more detail above in connection with FIG. 5. For example, the diagnostic module 520 may determine the maximum and minimum values of the calculated $P_{pan}$ values ($P_{pan,max}$ and $P_{pan,min}$, respectively) and then use these maximum and minimum values to calculate a probability for each panel 502 that the panel 502 is fully or partially shaded ($\rho$). The diagnostic module 520 may also determine the maximum value of the calculated probabilities ($\rho_{max}$).

After analyzing the panels 502 (step 804), the diagnostic module 520 may then determine whether the photovoltaic system 500 is operating under quasi-ideal conditions (step 806). For example, for some embodiments, the diagnostic module 520 may compare the maximum value of the calculated probabilities that the panels 502 are shaded ($\rho_{max}$) to a predefined DMPPT threshold ($\rho_{DMPPT}$). If $\rho_{max}$ is less than $\rho_{DMPPT}$, the maximum output power and the minimum output power of the panels 502 are close enough together that the probability of a mismatch among the panels 502 may be considered extremely low, and the system 500 may be considered to be operating under quasi-ideal conditions. Similarly, if $\rho_{max}$ is not less than $\rho_{DMPPT}$, the maximum output power and the minimum output power of the panels 502 are far enough apart that the probability of a mismatch among the panels 502 may not be considered extremely low, and the system 500 may be considered not to be operating under quasi-ideal conditions.

If the diagnostic module 520 determines that the system 500 is not operating under quasi-ideal conditions (step 806), the control module 525 enables the local controllers 508 (step 808) and disables the global controller 540 (step 810), thereby placing the system 500 in the DMPPT mode. Thus, in this situation, the local controllers 508 perform MPPT for each individual panel 502.

Because the DMPPT mode is used for even relatively small mismatches among the panels 502, the diagnostic module 520 may determine that the system 500 is not operating under quasi-ideal conditions even when the probability of shaded panels 502, though not considered extremely low, is still considered low. Thus, after entering the DMPPT mode, the diagnostic module 520 determines whether the probability of shaded panels 502 is high (step 812). For example, the diagnostic module 520 may compare the maximum probability that a panel 502 is shaded ($\rho_{max}$) to a predefined diagnostic threshold ($\rho_{diag}$). If $\rho_{max}$ is greater than $\rho_{diag}$, the maximum output power and the minimum output power of the panels 502 are far enough apart that the probability of a mismatch among the panels 502 may be considered relatively high, and thus the probability of at least one shaded panel 502 is high.

If there is a high probability of shaded panels 502 (step 812), the diagnostic module 520 performs a full characteristic scan for any potentially shaded panels 502 (step 814). For example, the diagnostic module 520 may identify potentially shaded panels 502 by comparing, for each panel 502, the probability that the panel 502 is shaded ($\rho$) to the diagnostic threshold ($\rho_{diag}$). If $\rho$ for a particular panel 502 is greater than $\rho_{diag}$, the output power of that particular panel 502 is far enough apart from the maximum output power provided by a panel 502 in the system 500 that the probability is relatively high that the particular panel 502 is at least partially shaded.

In performing the full characteristic scans, the diagnostic module 520 may individually perform a scan of the voltage-to-power characteristic for each potentially shaded panel 502 based on a timing provided by the central array controller 510. In this way, the conversion stage 512 may continue to operate normally during the scans.

If during the course of performing any full characteristic scans the diagnostic module 520 determines that any panels 502 are under-performing (i.e., operating at a local maximum power point (MPP), such as the local MPP 720, instead of an actual MPP, such as the MPP 725), the control module 525 may provide corrections to these under-performing panels 502 (step 816).

At this point, or if there is not a high probability of shaded panels 502 (step 812), the diagnostic module 520 determines whether the timer has expired (step 818), indicating that the method 800 is to be initiated again. Once the timer does expire (step 818), the diagnostic module 520 resets the timer (step 820) and begins to analyze the panels 502 again (step 804).

If the diagnostic module 520 determines that the system 500 is operating under quasi-ideal conditions (step 806), the control module 525 disables the local controllers 508 (step 822) and enables the global controller 540 (step 824), thereby placing the system 500 in the CMPPT mode. Thus, in this situation, the global controller 540 performs MPPT for the entire system 500.

At this point also, the diagnostic module 520 determines whether the timer has expired (step 818), indicating that the method 800 is to be initiated again. Once the timer does expire (step 818), the diagnostic module 520 resets the timer (step 820) and begins to analyze the panels 502 again (step 804).

Although FIG. 8 illustrates an example of a method 800 for selecting between centralized and distributed MPPT, various changes may be made to this method 800. For example, although the method 800 is described with reference to a photovoltaic system, the method 800 may be implemented for other energy generating systems 500, such as a wind turbine system, a fuel cell system or the like. Furthermore, although the method 800 is described with reference to the system 500 of FIG. 5, it will be understood that the method 800 may be implemented in any suitably arranged energy generating system without departing from the scope of this disclosure. In addition, while shown as a series of steps, the steps in the method 800 may overlap, occur in parallel, occur multiple times, or occur in a different order.

Figure 9:
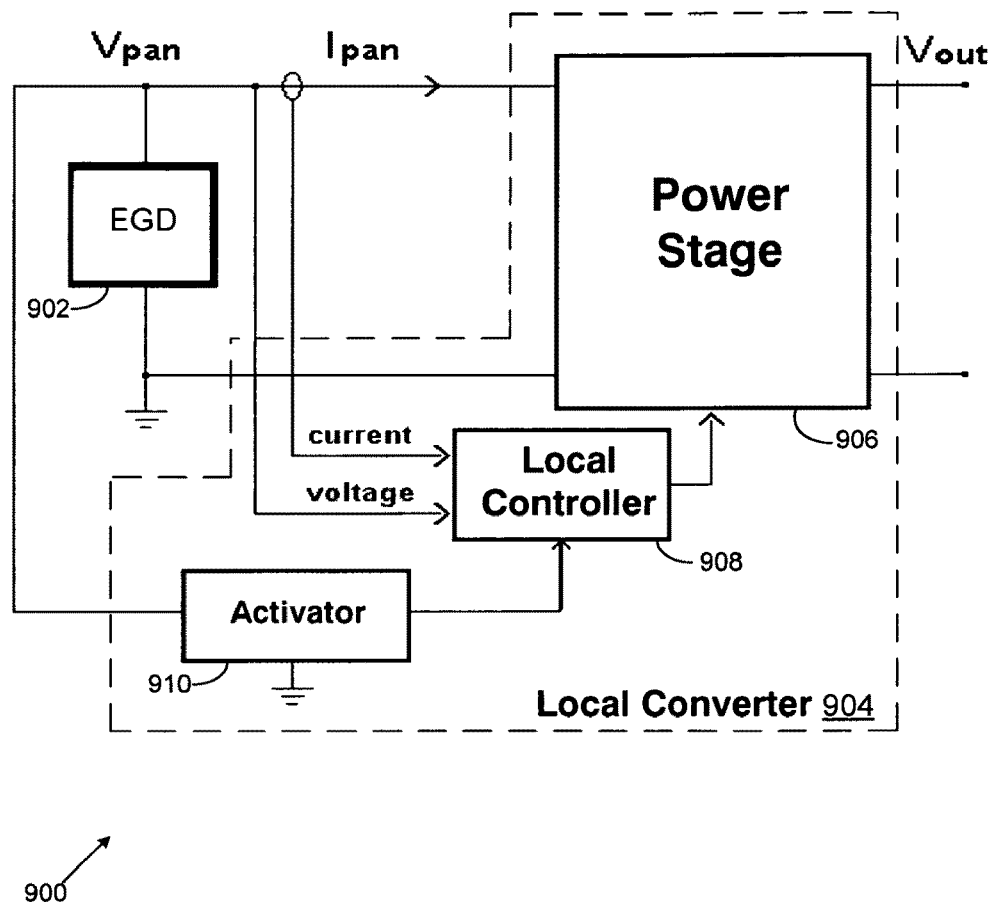
FIG. 9 illustrates a system for activating and deactivating a local controller for a local converter in an energy generating system in accordance with one embodiment of this disclosure.

FIG. 9 illustrates a system 900 for activating and deactivating a local controller 908 for a local converter 904 in an energy generating system in accordance with one embodiment of this disclosure. The system 900 comprises an energy generating device 902, which is referred to as a photovoltaic panel 902, and a local converter 904. The local converter 904 comprises a power stage 906, a local controller 908 and an activator 910.

The local converter 904 may represent one of the local converters 104 of FIG. 1B, the local converter 204 of FIG. 2 or 3, and/or one of the local converters 504 of FIG. 5; however, it will be understood that the local converter 904 may be implemented in any suitably arranged energy generating system without departing from the scope of this disclosure. Thus, it will be understood that the system 900 may be coupled to other similar systems 900 in series and/or in parallel to form an energy generating array.

For the illustrated embodiment, the activator 910 is coupled between the panel 902 and the local controller 908. For some embodiments, the activator 910 is capable of activating and deactivating the local controller 908 based on the output voltage of the panel 902. When the output voltage of the panel 902 is too low, the activator 910 may be capable of providing a supply voltage to the local controller 908 that is essentially zero, thereby shutting off the local controller 908. When the output voltage of the panel 902 is higher, the activator 910 may be capable of providing a non-zero supply voltage to the local controller 908 such that the local controller 908 is operative.

It will be understood that the activator 910 may be capable of activating and deactivating the local controller 908 in any suitable manner other than providing the supply voltage to the local controller 908. For example, for one alternative, the activator 910 may be capable of setting one or more pins of the local controller 908 in order to activate and deactivate the local controller 908. For another alternative, the activator 910 may be capable of writing a first predefined value to a first register in the local controller 908 in order to activate the local controller 908 and writing a second predefined value (which may be the same as or different from the first predefined value based on the particular implementation) to either the first register or a second register in the local controller 908 in order to deactivate the local controller 908.

Thus, the system 900 provides for the autonomous operation of the local converter 904 without the use of batteries or external power supplies. When the solar irradiance is high enough, the output panel voltage, $V_{pan}$, increases to a level that causes the activator 910 to begin generating the non-zero supply voltage, $V_{cc}$. At this point, the local controller 908 and/or a central array controller (not shown in FIG. 9) may begin performing activation procedures, such as initialization of registers, preliminary voltage comparisons among the panels 902, analog-to-digital converter calibrations, clock synchronization or interleaving, synchronous activation of the power stages 906 and/or the like. Similarly, before deactivating the system 900, deactivation procedures may be performed, such as synchronization with a back-up unit in cases of stand-alone applications, synchronous deactivation of the power stages 906 and/or the like. During these deactivation procedures, the activator 910 is capable of remaining activated itself.

In addition, for some embodiments, the activator 910 may be capable of providing over power protection for the local converter 904. As described above in connection with FIG. 3, the MPPT control block 304, which is part of the local controller 208, may provide over power protection. However, as an alternative for systems including an activator 910, the activator 910 may be capable of providing this protection instead. Thus, for this alternative, if the output current drops too low, the activator 910 may switch off the MPPT functionality of the local controller 908 such that the panel voltage, $V_{pan}$, is approximately equal to the output voltage, $V_{out}$.

Figure 10:
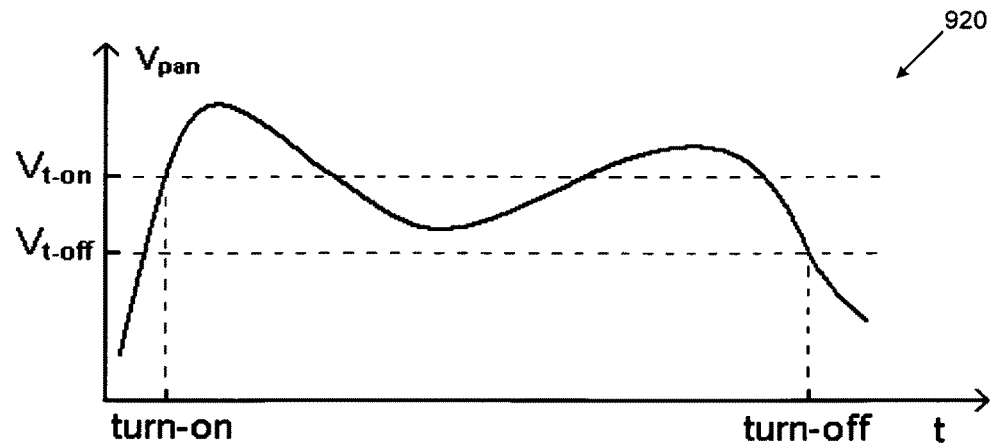
FIG. 10 illustrates an example of device voltage variation with time for the system of FIG. 9 in accordance with one embodiment of this disclosure.

FIG. 10 is a graph 920 illustrating an example of device voltage variation with time for the system 900 in accordance with one embodiment of this disclosure. For a photovoltaic panel 902, in situations in which the solar irradiance level oscillates around the voltage activation level ($V_{t-on}$) for the activator 910, using the same voltage activation level as a voltage deactivation level ($V_{t-off}$) would generated undesirable multiple activations and deactivations of the system 900. Thus, as shown in the graph 920, a lower voltage deactivation level may be used in order to prevent this scenario. By using this lower voltage deactivation level, the system 900 may remain consistently activated until the solar irradiance level decreases enough such that the panel voltage falls to a level somewhat lower than the voltage activation level. As a result, frequent activations and deactivations are avoided, providing noise immunity for the system 900.

For some embodiments, after the panel voltage exceeds the voltage activation level resulting in the activation of the local controller 908, the local controller 908 may begin the deactivation procedure if the panel voltage drops below the voltage activation level in order to be able to more quickly deactivate if the panel voltage continues to fall to a level lower than the voltage deactivation level. In addition, for some embodiments, the local controller 908 may be capable of shutting off the activator 910, and thus itself, before the voltage deactivation level is reached for particular situations.

Figure 11:
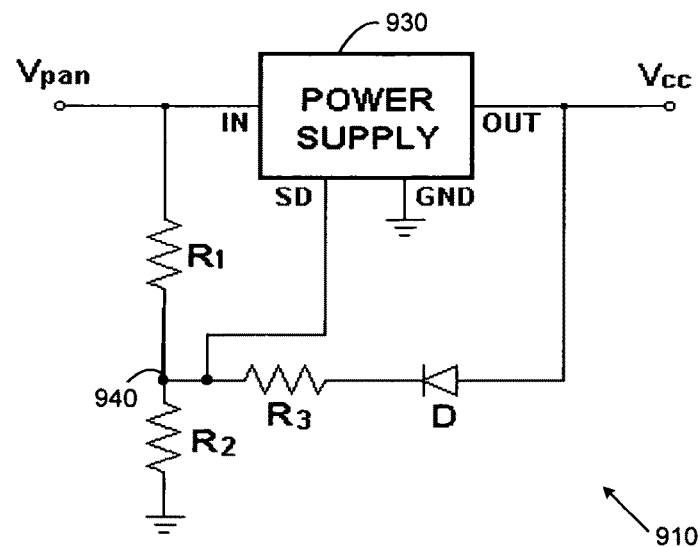
FIG. 11 illustrates the activator of FIG. 9 in accordance with one embodiment of this disclosure.

FIG. 11 illustrates the activator 910 in accordance with one embodiment of this disclosure. For this embodiment, the activator 910 comprises a power supply 930, a plurality of resistors R1, R2 and R3, and a diode D. The resistors R1 and R2 are coupled in series between an input node (IN) of the power supply 930 and ground. The diode and the resistor R3 are coupled in series between an output node (OUT) of the power supply 930 and a node 940 at which the resistors R1 and R2 are coupled together. In addition, a shutdown node (SD) of the power supply 930 is also coupled to the node 940.

The power supply 930 is capable of receiving the panel voltage, $V_{pan}$, at the input node and generating a supply voltage, $V_{cc}$, for the local controller 908 at the output node. The shutdown node of the power supply 930 enables the operation of the power supply 930 if the voltage level at the shutdown node as determined by a control circuit of the power supply 930 exceeds a specified voltage, $V_0$, and disables the operation of the power supply 930 if the voltage level at the shutdown node falls below the specified voltage, $V_0$.

When the power supply 930 is turned off, the diode is not conducting and the voltage at the shutdown node is given by $$V_{SD,t-on} = V_{pan} \frac{R_2}{R_1 + R_2}.$$

When the voltage $V_{SD,t-on}$ exceeds the value $V_0$, the diode starts conducting and the voltage at the shutdown node becomes $$V_{SD,t-off} = V_{pan} \frac{R_2//R_3}{R_1 + R_2//R_3} + (V_{cc} - V_d)\frac{R_1//R_2}{R_3 + R_1//R_2},$$

where $V_d$ is the diode voltage drop and $$x//y = \frac{xy}{x+y}.$$

When the voltage $V_{SD,t-off}$ drops below $V_0$, the power supply 930 is turned off. The turn-on and turn-off voltage thresholds are thus determined based on the resistances provided by the resistors R1, R2 and R3.

Figure 12:
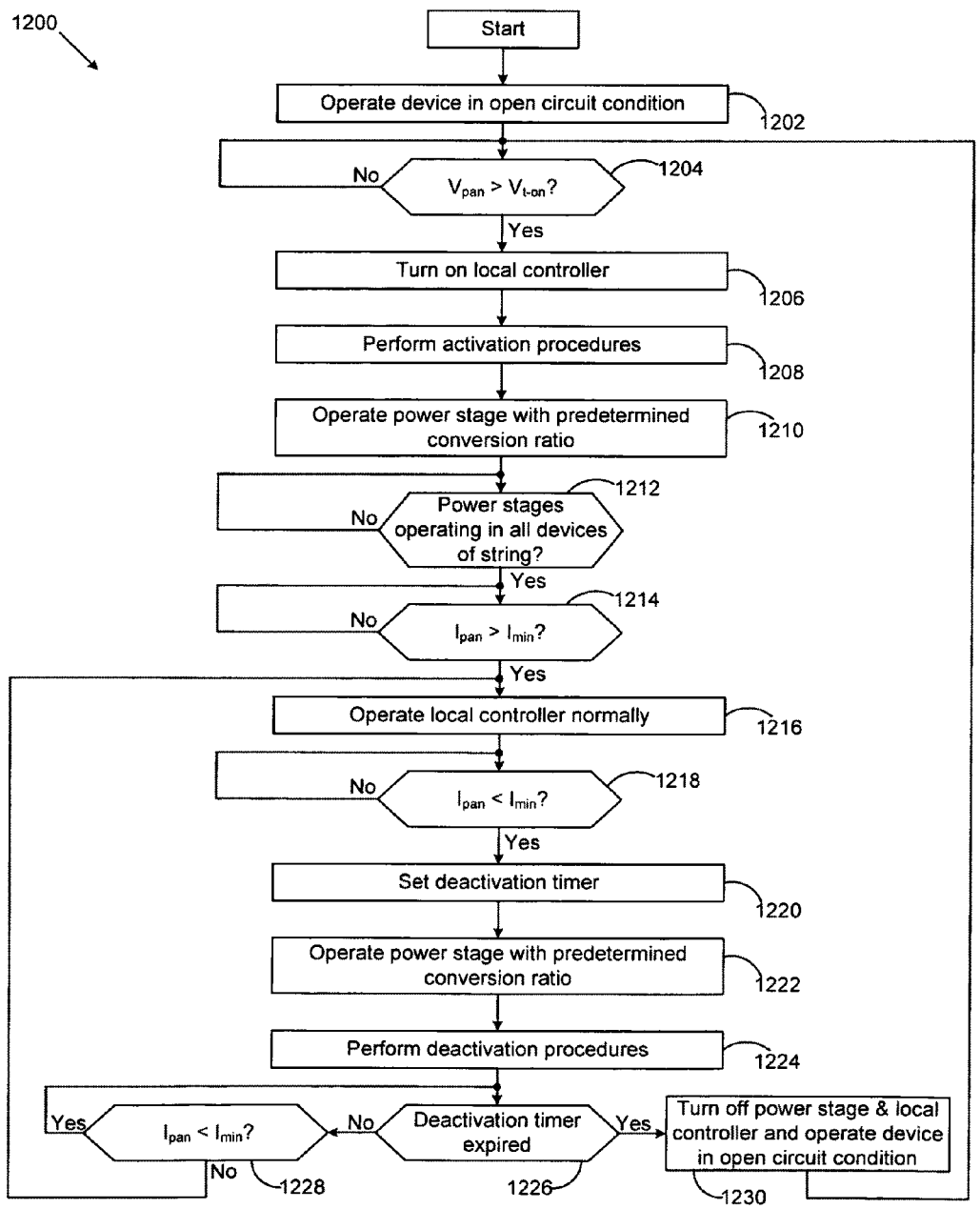
FIG. 12 illustrates a method for activating and deactivating the local converter of FIG. 9 in accordance with one embodiment of this disclosure.

FIG. 12 illustrates a method 1200 for activating and deactivating the local converter 904 in accordance with one embodiment of this disclosure. The embodiment of the method 1200 is for illustration only. Other embodiments of the method 1200 may be implemented without departing from the scope of this disclosure.

The method 1200 begins with the energy generating device, or panel, 902 operating in an open circuit condition (step 1202). In this condition, the activator 910 has not activated the local controller 908 because the panel voltage output by the panel 902 is too low. The activator 910 monitors this panel voltage ($V_{pan}$) until it exceeds the voltage activation level ($V_{t-on}$) (step 1204).

Once the activator 910 determines that the panel voltage has exceeded the voltage activation level (step 1204), the activator 910 begins to activate the local converter 904 by turning on the local controller 908 (step 1206). For example, the activator 910 may begin to activate the local converter 904 by generating a non-zero supply voltage, $V_{cc}$, for the local controller 908. For other embodiments, the activator 910 may begin to activate the local converter 904 by setting one or more pins of the local controller 908 or by writing a first predefined value to a first register in the local controller 908. The local controller 908 and/or a central array controller then perform activation procedures for the local converter 904 (step 1208). For example, the activation procedures may include initialization of registers, preliminary voltage comparisons among panels 902, analog-to-digital converter calibrations, clock synchronization or interleaving, synchronous activation of a string of panels that include the power stage 906 and/or the like.

The local controller 908 operates the power stage 906 with a predetermined conversion ratio (step 1210) until the other power stages 906 in the string are operational (step 1212). Once each of the panels 902 in the string has an operational power stage 906 (step 1212), the local controller 908 compares the panel current ($I_{pan}$) to an activation current level ($I_{min}$) (step 1214). If the panel current is greater than the activation current level (step 1214), the local controller 908 begins to operate normally (step 1216). Thus, the local controller 908 begins performing MPPT for the power stage 906.

In this way, the activation of all local controllers 908 in an energy generating system may be automatically synchronized. In addition, if only a subset of the panels 902 in the photovoltaic system produce a voltage that is high enough to result in activation by the activator 910, a unidirectional switch, such as switch 314, may be included in each of the power stages 906 to allow the remaining panels 902 to be operated.

The local controller 908 continues to compare the panel current to the activation current level (step 1218). If the panel current is less than the activation current level (step 1218), the local controller 908 sets a deactivation timer (step 1220). The local controller 908 then reverts to operating the power stage 906 with a predetermined conversion ratio (step 1222). The local controller 908 and/or a central array controller then perform deactivation procedures for the local converter 904 (step 1224). For example, the deactivation procedures may include synchronization with a back-up unit in cases of stand-alone applications, synchronous deactivation of power stages 906 and/or the like.

The local controller 908 then determines whether the deactivation timer has expired (step 1226). This allows time for the panel current to increase above the activation current level. Thus, the local controller 908 prepares for deactivation but waits to ensure that deactivation should actually be performed.

Therefore, as long as the deactivation timer has not expired (step 1226), the local controller 908 compares the panel current to the activation current level (step 1228). If the panel current continues to remain less than the activation current level (step 1228), the local controller 908 continues to wait for the deactivation timer to expire (step 1226). If the panel current becomes greater than the activation current level (step 1228) before the deactivation timer expires (step 1226), the local controller 908 again operates normally by performing MPPT for the power stage 906 (step 1216).

However, if the deactivation timer does expire (step 1226) while the panel current is less than the activation current level (step 1228), the local controller 908 turns off the power stage 906 and the local controller 908, and the panel 902 is again operated in the open circuit condition (step 1230). For some embodiments, the activator 910 may complete deactivation of the local converter 904 by generating a zero supply voltage, $V_{cc}$, for the local controller 908. For other embodiments, the activator 910 may complete deactivation of the local converter 904 by setting one or more pins of the local controller 908 or by writing a second predefined value to either the first register or a second register in the local controller 908. At this point, the activator 910 once again monitors the panel voltage until it exceeds the voltage activation level (step 1204), reinitiating the activation process.

Although FIG. 12 illustrates an example of a method 1200 for activating and deactivating the local converter 904, various changes may be made to this method 1200. For example, although the method 1200 is described with reference to a photovoltaic panel, the method 1200 may be implemented for other energy generating devices 902, such as wind turbines, fuel cells or the like. Furthermore, although the method 1200 is described with reference to the local controller 908 and the activator 910 of FIG. 9, it will be understood that the local controller 908 and the activator 910 may be implemented in any suitably arranged energy generating system without departing from the scope of this disclosure. Also, while shown as a series of steps, the steps in the method 1200 may overlap, occur in parallel, occur multiple times, or occur in a different order.

Although the above descriptions refer to particular embodiments, it will be understood that some of the described components, systems and methods may be applied to a sub-cell, a single cell, a panel (i.e., a cell array), a panel array and/or a system of panel arrays. For example, although the local converters described above are each associated with a panel, similar systems may be implemented with a local converter for each cell in a panel or for each string of panels. In addition, some of the described components, systems and methods may be applied to energy generating devices other than photovoltaic devices, such as wind turbines, fuel cells or the like.

It may be advantageous to set forth definitions of certain words and phrases that have been used within this patent document. The term "couple" and its derivatives refer to any direct or indirect communication between two or more components, whether or not those components are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The term "each" means every one of at least a subset of the identified items. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for providing a maximum power point tracking (MPPT) process for an energy generating device, the method comprising:
   determining whether a local converter coupled to the energy generating device is operating at or below a maximum acceptable temperature;
   determining whether at least one current associated with the local converter is acceptable; and
   when the local converter is determined to be operating at or below the maximum acceptable temperature and when the at least one current associated with the local converter is determined to be acceptable, enabling the MPPT process within the local converter.

2. The method of claim 1, further comprising:

when the local converter is determined to be operating above the maximum acceptable temperature, disabling the MPPT process within the local converter.

3. The method of claim 1, further comprising:
when the local converter is determined to be operating above the maximum acceptable temperature, setting a conversion ratio for the local converter to an initial conversion ratio.

4. The method of claim 1, further comprising:
when the at least one current associated with the local converter is determined to be unacceptable, disabling the MPPT process within the local converter.

5. The method of claim 4, wherein:
the at least one current associated with the local converter comprises an average output current for the local converter; and
the average output current is determined to be acceptable when the average output current is less than a maximum output current.

6. The method of claim 4, wherein the at least one current associated with the local converter comprises:
an output current for the local converter; and
an average input current for the local converter.

7. The method of claim 6, wherein:
when the MPPT process is disabled, the output current and the average input current are determined to be acceptable based on an upper minimum current threshold; and
when the MPPT process is enabled, the output current and the average input current are determined to be acceptable based on a lower minimum current threshold.

8. The method of claim 1, wherein the MPPT process comprises:
comparing an average output voltage to a maximum output voltage; and
when the average output voltage is greater than the maximum output voltage, decreasing a conversion ratio for the MPPT process while continuing to operate the local converter.

9. A method for providing a maximum power point tracking (MPPT) process for an energy generating device, the method comprising:
determining whether a local converter coupled to the energy generating device is operating at or below a maximum acceptable temperature;
determining whether an average output current for the local converter is less than a maximum output current;
determining whether an output current for the local converter is acceptable;
determining whether an average input current for the local converter is acceptable; and
enabling the MPPT process within the local converter when (i) the local converter is determined to be operating at or below the maximum acceptable temperature, (ii) the average output current is determined to be less than the maximum output current, (iii) the output current is determined to be acceptable, and (iv) the average input current is determined to be acceptable.

10. The method of claim 9, further comprising:
disabling the MPPT process within the local converter when (i) the local converter is determined to be operating above the maximum acceptable temperature, (ii) the average output current is determined to be greater than the maximum output current, (iii) the output current is determined to be unacceptable, or (iv) the average input current is determined to be unacceptable.

11. The method of claim 10, wherein:
when the MPPT process is disabled, the output current and the average input current are determined to be acceptable based on an upper minimum current threshold; and
when the MPPT process is enabled, the output current and the average input current are determined to be acceptable based on a lower minimum current threshold.

12. The method of claim 10, further comprising:
when the MPPT process is disabled, setting a conversion ratio for the local converter to an initial conversion ratio.

13. The method of claim 9, wherein the MPPT process comprises:
comparing an average output voltage to a maximum output voltage; and
when the average output voltage is greater than the maximum output voltage, decreasing a conversion ratio for the MPPT process while continuing to operate the local converter.

14. A system for providing maximum power point tracking (MPPT) for an energy generating device, the system comprising a local converter, the local converter comprising:
a power stage operable to receive a device voltage and a device current from the energy generating device and to generate an output voltage and an output current based on the device voltage and the device current; and
a local controller operable to provide MPPT for the power stage, the local controller comprising an MPPT module operable to:
determine whether the local converter is operating at or below a maximum acceptable temperature;
determine whether at least one current associated with the local converter is acceptable; and
enable an MPPT process within the local converter when the local converter is determined to be operating at or below the maximum acceptable temperature and when the at least one current associated with the local converter is determined to be acceptable.

15. The system of claim 14, wherein, when the local converter is determined to be operating above the maximum acceptable temperature, the MPPT module is further operable to disable the MPPT process within the local converter and to set a conversion ratio for the local converter to an initial conversion ratio.

16. The system of claim 14, wherein the MPPT module is operable to disable the MPPT process within the local converter when the at least one current associated with the local converter is determined to be unacceptable.

17. The system of claim 16, wherein:
the at least one current associated with the local converter comprises an average output current for the local converter; and
the MPPT module is operable to determine whether the at least one current associated with the local converter is acceptable by determining whether the average output current is less than a maximum output current.

18. The system of claim 17, wherein:
the at least one current associated with the local converter further comprises an output current for the local converter and an average input current for the local converter; and
the MPPT module is operable to determine whether the at least one current associated with the local converter is acceptable by:
determining whether the output current and the average input current are each greater than an upper minimum current threshold while the MPPT process is disabled; and determining whether the output current and the average input current are each less than a lower minimum current threshold while the MPPT process is enabled.

19. The system of claim 14, wherein the MPPT process comprises:

comparing an average output voltage to a maximum output voltage; and when the average output voltage is greater than the maximum output voltage, decreasing a conversion ratio for the MPPT process while continuing to operate the local converter.

20. The system of claim 14, wherein the energy generating device comprises a photovoltaic panel.

* * * * *